United States Patent
Mond et al.

(10) Patent No.: US 11,893,640 B2
(45) Date of Patent: Feb. 6, 2024

(54) METHOD OF INTERACTIVE FINANCIAL SERVICE INCLUDING INVESTING, FUNDING AND TRADING, AND APPARATUS, INTERFACE AND PLATFORM THEREOF

(71) Applicants: Alex Mond, Encino, CA (US); Darshan Sedani, Encino, CA (US); Teodros Gessesse, Encino, CA (US)

(72) Inventors: Alex Mond, Encino, CA (US); Darshan Sedani, Encino, CA (US); Teodros Gessesse, Encino, CA (US)

(*) Notice: Subject to any disclaimer, the term of this patent is extended or adjusted under 35 U.S.C. 154(b) by 0 days.

(21) Appl. No.: 16/011,009

(22) Filed: Jun. 18, 2018

(65) Prior Publication Data
US 2018/0365767 A1 Dec. 20, 2018

Related U.S. Application Data

(60) Provisional application No. 62/521,793, filed on Jun. 19, 2017.

(51) Int. Cl.
*G06Q 40/00* (2023.01)
*G06Q 40/06* (2012.01)
*G06Q 20/10* (2012.01)
*G06Q 40/08* (2012.01)

(52) U.S. Cl.
CPC .......... *G06Q 40/06* (2013.01); *G06Q 20/10* (2013.01); *G06Q 40/08* (2013.01)

(58) Field of Classification Search
CPC ........ G06Q 40/06; G06Q 20/10; G06Q 40/08; G06Q 20/306; G06Q 20/384

USPC ....................................................... 705/35–45
See application file for complete search history.

(56) References Cited

U.S. PATENT DOCUMENTS

| | | | |
|---|---|---|---|
| 8,386,365 B2 * | 2/2013 | Chien ................... | G06Q 40/04 705/37 |
| 2011/0022500 A1 * | 1/2011 | Scheinfeld ......... | G06Q 30/0603 705/27.2 |
| 2011/0313944 A1 * | 12/2011 | Jagarlapudi ............ | G06Q 10/10 705/37 |
| 2014/0012780 A1 * | 1/2014 | Sanders ................. | G06Q 40/04 705/36 R |

OTHER PUBLICATIONS

Wharton Study: How Social Media Can Impact Your Chances to Raise Venture Capital (Year: 2018).*
Google Scholar Search, dated May 16, 2022. (Year: 2022).*
Google Patents Search, dated May 16, 2022 (Year: 2022).*

* cited by examiner

*Primary Examiner* — Hai Tran
(74) *Attorney, Agent, or Firm* — STAAS & HALSEY LLP

(57) ABSTRACT

Disclosed herein is a method, apparatus, interface and platform for interactive investing, funding and trading. The Great Disruptors Platform (TGDP) provides a platform to companies (business entities) to raise capital online in exchange for equity, royalty and/or other compensation from individual investors and other investors by engaging with the potential investors.

7 Claims, 17 Drawing Sheets

101

520

1000

Projects 1002

Project Details 1004

Webisodes 1006

Live TV 1008

1100

1102

1104

1106

METHOD OF INTERACTIVE FINANCIAL SERVICE INCLUDING INVESTING, FUNDING AND TRADING, AND APPARATUS, INTERFACE AND PLATFORM THEREOF

BACKGROUND

1. Field

The present disclosure pertains to the field of equity investments, royalty and capital raising. More particularly, embodiments of the invention pertain to system, process, interface, platform and method of interactive financial service including funding, trading and investing.

2. Description of the Related Art

In current fund-raising practices, entrepreneurs with socially impactful ideas and business vision can raise funds through the manner of crowd investment processes. Most such processes, however, are based on crowd investors reviewing a project summary or a company profile online with minimal financial details, and making commitments to fund manually, one decision at a time, in just a single round of funding. However, these fund-raising processes and other practices fail to provide interactive, dynamic, optimized and multi-faceted system and method that improves the process of financial services including fund/capital raising and decision-making for entrepreneurs and investors.

Generally, the process of private equity investment in the venture capital industry includes steps where an entrepreneur submits a business plan for a company to produce a new product or service, technology and market information, a financial analysis of the prospects of the venture, and the amount sought with source and use of funds. The venture capital due diligence process analyses the business, market potential, technology, management, and capital appreciation potential in order to make an investment decision. The decision-making has always been manual and almost always relies on the assessment of a few individuals within the venture firm who may or may not have subject matter expertise. Regardless, it has been shown that there is very little correlation between venture characteristics, entrepreneur capability, product/service and technology and the actual venture investment appreciation, and therefore, there is no predictable way to estimate the probability of success of a venture from an investment growth point of view. No wonder less than 20% of all venture capital firms have been able to demonstrate a successful investment track record of wealth creation for their investors. The typical venture investment decision-making and evaluation is fairly manual, inefficient, not easily replicable, and has no dependable correlation to success factors.

Crowd funding is a new way for entrepreneurs with ideas, products and services to reach out to a potential investor community and be able to present their company, venture, project, or product/service solution over the internet to the crowd in order to attract small amounts of investment funding directly from large numbers of individuals. This is unlike the traditional process of an entrepreneur pitching to a venture capitalist to raise a large sum of money from a single investment fund of the venture firm, and the firm making the decision to invest in the company through one of the funds they manage for their accredited investors. In contrast, crowd funding is where the company approaches thousands of small investors directly to invest small amounts of money into the company. Most crowd funding business models today, however, are 'donation-based'. They provide rewards in exchange for a contribution. They are also limited to a small number of people who do not have a vested personal emotion about the proposed idea or product and its social impact upon society. There is no system that is capable of creating an emotional linkage between the individual investor and the entity seeking funding. What is needed is system, platform, method, interface, apparatus, and an informative multi-device application with strong backend regulation (i.e., SEC and FINRA) compliant exchange application infrastructure that handles funding and exchange transactions.

Moreover, even the crowd funding platforms today that offer a capability to entrepreneurs to present their company, venture, project over the internet and raise capital in exchange for equity and/or royalty in the company do so in a manner which can only be understood by a person with a financial background. The interaction and engagement between the small individual investor and these companies is limited to business queries. The means to reach out to these companies by an individual investor to know more about these companies are very minimal at best. There is also absence of coaching, interacting, and accessibility/availability of relevant information.

Although various means of funding and investing are available, there is a need for a platform that provides a dynamic, interactive, and multi-threaded ecosystem that can improve the process of fund/capital raising.

SUMMARY

A method, system, platform and interface described herein are directed to computer-implemented financial service. According to an embodiment, a computer-implemented method of providing a financial service is provided using one or more hardware processors. The computer-implemented method including generating content identifying a project for which an entity is requesting funding, distributing the content generated to one or more viewers, identifying a candidate investor to participate in the funding of the project, and applying a credit toward the funding of the project, and in response to the applying of the credit, transferring a value from the entity to the candidate investor in exchange for the credit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and/or other aspects will become apparent and more readily appreciated from the following description of the exemplary embodiments, taken in conjunction with the accompanying drawings, in which reference numerals denote structural elements, wherein.

DETAILED DESCRIPTION OF THE PREFERRED EMBODIMENTS

Figure 1:
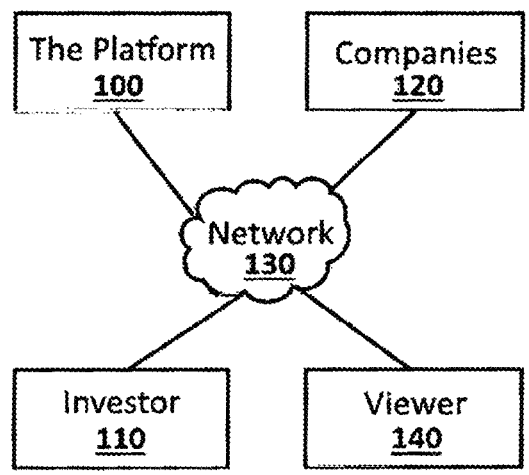
FIG. 1 shows an exemplary environment for a funding platform that facilitates investment in companies seeking funds according to an embodiment.

Reference will now be made in detail to embodiments, examples of which are illustrated in the accompanying drawings. In this regard, the embodiments may have different forms and should not be construed as being limited to the descriptions set forth herein. In order to further clearly describe features of the embodiments, descriptions of other features that are well known to one of ordinary skill in the art are omitted here.

The singular forms "a," "an" and "the" are intended to include the plural forms as well, unless the context clearly indicates otherwise. The term of "and/or" includes a plurality of combinations of relevant items or any one item among a plurality of relevant items.

The term "at least" preceding a listing of items denotes one or any combination of the items in the listing.

The terms "comprise(ing)," "include(ing)," and "have(ing)" when used in this specification, specify the presence of stated features, functions, processes/operations, elements, and/or components, but do not preclude the presence or addition of one or more other features, functions, processes/operations, elements, components, and/or groups thereof.

In the specification, when an element is "coupled" to another element, the elements may not only be "directly connected", but may also be "connected" via another element therebetween. The "coupling" may be mechanical, electrical, optical and/or by way of data communication. Also, when a region "includes" an element, the region may further include another element instead of excluding the other element, unless otherwise differently stated.

Also, a "unit" may denote hardware, display, electro-mechanical element(s), or components of computing hardware, such as a field-programmable gate array (FPGA), chipset and/or software executed by the computing hardware, that perform a function.

Technical problem: an aspect of the disclosure is to provide an interactive apparatus, interface and platform capable of fund-raising processes that is dynamic, optimized and multi-faceted system which is capable of processes of financial services including fund/capital raising and decision-making for entrepreneurs and investors.

Another aspect of the present disclosure is to provide an interface, apparatus, system and platform that provides an estimated probability of success of a venture from an investment growth point of view based on various factors including customer identifying information, project financial metrics, expert third party investor input pertinent to a project.

Technical Solution: an aspect of the disclosure is to generate content to be presented to a viewer including according to a recommendation engine, such as an artificial intelligence (AI) recommendation engine, which indicates an estimated probability of success and enables an individual to participate a process generally restricted to few individuals.

An aspect of the disclosure improves capability of a system to enable an individual to participate from the individual's apparatus to convert the individual from a potential/candidate investor to actual investor by connecting the individual with selected fund seeking business owners via platform.

As set forth herein in detail, a method, an apparatus, an interface (a graphical user interface (GUI)), an application and a platform for a computer-implemented financial service including interactive investing, funding and trading is disclosed. According to an embodiment, the platform which is also referred to as, The Great Disruptors Platform (TGDP), allows an entity such as a business, a company, an entrepreneur, etc., to raise capital online in exchange for equity and/or any other consideration such as royalty from investor(s) by providing an environment in which applicable information is presented to potential investor(s) through interactive content delivery medium like the web, a smart phone, television and OTT (Over-the-top) software applications.

According to an embodiment, the disclosed method, interface, apparatus and platform (TGDP) present financial service of interactive crowd-funding and equity-trading. In one embodiment, the TGDP is a platform that uses Television/OTT based interactive crowd-funding, equity-trading and crowd investing media platform. The platform is configured to empower companies, entrepreneurs such as social impact disruptor entrepreneurs, ordinary people with extraordinary disruptor ideas, inventions and products they've created to help solve globally occurring issues such as health, wellness, science, energy, ecological stability, sustainability, global warming, and clean water solutions by raising capital in return for actual equity and/or royalty in the company.

According to an embodiment, selected investors from the globe may invest in these companies that can be the next generation of the fortune 500. It may feature top, high net-worth global business entities, government and foundation leaders and philanthropists (the panel) who seek to invest in the world's meaningful social impact initiatives, inventions, products, services and campaigns to help change the world and make it a better place. This global billionaire panel evaluates the qualitative and quantitative aspects of the social impact projects in a variety of sectors.

Set forth below in detail are embodiments which are illustrated in the accompanying drawings.

FIG. 1 illustrates an exemplary environment for a funding platform that facilitates investment in companies seeking funds according to an embodiment. FIG. 1 shows a system 101 which provides an environment for a funding platform. A platform 100 of the system 101 facilitates investment in companies seeking funds for a project, a cause, etc., for example, a company's social impact cause(s). FIG. 1 illustrates an embodiment of the system 101, which includes the Platform 100, Companies 120, Investors 110, Viewer/Viewers 140 that are communicatively coupled to each other via a network 130 and come together via the network 130 to form an ecosystem of the system 101. As described herein, the components illustrated in FIG. 1 may be implemented using software component(s), hardware component(s) and/or any combination thereof. While FIG. 1 is illustrated with plural companies 120 and singular investor 110 and viewer 140, the system 101 is not limited to any number of companies, investors, and viewers. At any given time, there may be one or more companies, investors, and viewers.

The platform 100 provides a media and funding platform for getting together companies 120 seeking investments with viewer/viewers 140 and (actual) investors 110. The platform 100 enables the companies 120 to showcase different aspects to potential investors such key project details for which they are seeking investment, videos to showcase the projects, key stakeholder information, relevant white papers, documents, and other relevant details which will help convert any viewer/viewers 140 that are potential investors to actual investors (investor 110). According to an embodiment, the platform 100 shown in FIG. 1 may be implemented via a server communicating through the network 130 to receive a request containing corresponding information of the companies 120 and a project/cause associated with the companies 120, distribute the information to computers utilized by the viewers 140 and determine whether investor 110 exists for funding in return for equity in the companies 120. The platform 110 may be implemented via any computer, terminal, device, system, etc., that provides functionality to communicate through the network 130.

According to an embodiment, companies 120 shown in FIG. 1 represent machines/computers enabled to exchange information through the network 130 of the system 101. The companies 120 may be implemented using a desktop or laptop computer, a handheld/portable device such as a personal digital assistant (PDA), mobile phone, and a specialized terminal, or any machine that is capable of sending and/or receiving of information via the network 130. For example, the companies 120 in FIG. 1 may be businesses who are making an impact on various social causes may wish to participate to seek to raise funds from potential investors as well as from accredited investors, from the audience of a televised show. The televised show may be in series format with infinite variety of unique, sought-after, global, and life-changing products, services and/or ideas presented to an international investor audience in the hopes of making an investment partnership deal. These companies 120 may wish to make sure that the business chain is socially acceptable.

The companies 120 may be of individual entrepreneurs which may not be experienced in managing the fund received from the public. The platform 100 provides a method for funding of the company project(s) by means of the TGDP software system that comprises of a secure cloud based funding backend, a funding application configured to receive funding from an audience (viewers) via regulatory compliant financial means, and transfer equity of the company in return to the investor in the company.

The investor 110 shown in FIG. 1, according to an embodiment, represent machines/computers enabled to send and/or receive information through the network 130 of the system 101 and as a result, may take equity or other consideration in the companies 120 and/or their associated projects. A person (a user) may become an investor 110 by interacting through the system 101 via a desktop or laptop computer, a handheld/portable device such as a personal digital assistant (PDA), mobile phone, and a specialized terminal, or any machine that is capable of sending and/or receiving of information via the network 130. The investor 110 can be a panel of both foreign and American wealthy venture capitalists who are determined to change the world for the better by investing in socioeconomic solutions, and/or any of the viewer 140 who can also invest and contribute in the growth of these companies 120. By way of example, the viewers 140 in FIG. 1 are illustrated as having the capability to be presented with content from the system 101. However, the system 101 is not limited to visual delivery of content and may include audio dissemination of the content.

The viewer 140 shown in FIG. 1, according to an embodiment, represent machines/computers enabled to send and/or receive information through the network 130 of the system 101. A person (a user) may be the viewer 140 by interacting through the system 101 via a desktop or laptop computer, a handheld/portable device such as a personal digital assistant (PDA), mobile phone, and a specialized terminal, or any machine that is capable of sending and/or receiving of information via the network 130.

Through interaction using the system 101, conversion of the viewer 140 as a potential (candidate) investor to an (actual) investor 110 in projects/businesses seeking funding is increased. The system 101 enables broadcasts of content such as streaming videos about business projects, business owners and teams, business relevant white papers and documents, fundable project descriptions and metadata to provide a potential investor with a set of information relevant to a business seeking crowd funding. For example, the system 101 improves the conversion of potential investors to actual investors by enabling a means to get in touch with fund seeking business owners via platform based on various interaction channels like public comments, private question and answer (Q&A) sessions, emails and live video conversations. The system can also receive money from accredited investors for meeting regulation A or A+. This method is extended to Mini initial public offering (IPO) or IPO.

The system 101 as the TGDP system also provides a mechanism to enable second offering from accredited investors. These investments can be liquid at least by three ways: buy backs, convert it to royalty, and sell at an auction.

The various systems shown in the environment of the system 101 of FIG. 1 communicate via the network 130, which may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

While examples of the platform 100, companies 120, investor 110, viewer 140 is provided herein, communication of the system 101 is not limited to being through any particular device, network or software, and may be performed by any program or machine that allows communication to be performed directly with another device and/or through the Network 130 and/or other network(s).

Any one of the platform 100, companies 120, investor 110 and/or viewer 140 of the system 101 as described herein may be a corresponding one or more general-purpose or special purpose computer, such as, for example, a processor, a controller, an arithmetic logic unit (ALU), a microcomputer, a field programmable gate array (FPGA), a programmable logic unit (PLU), a microprocessor, or any other device capable of responding to and executing instructions in a defined manner.

Figure 2:
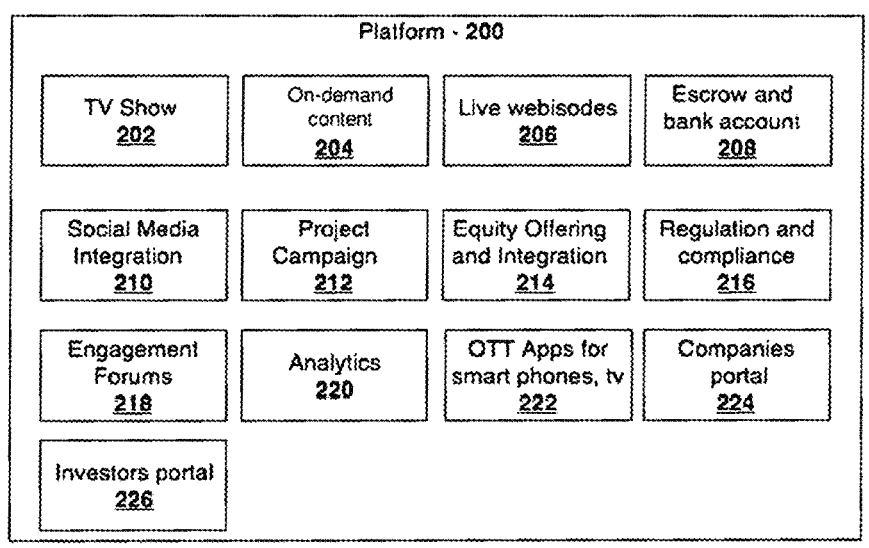
FIG. 2 shows exemplary components of a platform for a financial service including funding according to one embodiment.

FIG. 2 illustrates exemplary components of a platform for a financial service including a process of funding according to one embodiment. FIG. 2. shows sub-components that are associated with platform 200, according to an embodiment. Any of the sub-components may be implemented via machine/computer configured to electronically communicate with other machine/computer directly and/or via a network(s). Platform 200 may include an environment in which one or more software, operating system, web or other application is executed. The Platform 200 shown in FIG. 2 may be implemented using software component(s), hardware component(s) and/or any combination thereof.

According to an embodiment illustrated in FIG. 2, the platform 200 includes a television (TV) Show 202, which may have multiple episodes that will be recoded and broadcasted including traditional television including during prime time. According to an embodiment, the platform 200 is configured to the present TV Show 202 that is generated to create linkage between potential an individual person (i.e., potential investor) and an entity seeking funding.

In an embodiment, the platform, method, apparatus and interface are configured to electronically transmit content to viewers where the content is presented to the viewers along with additional (supplemental) applicable data pertaining to the content to engage the viewers to participate in funding of a project detailed in the content and take equity in the project. For example, the content may be an interactive emotional video of a show transmitted through televisions, websites, connected smart television OTT applications and handheld smart device applications such as a smart phone application. The content is not limited to any particular subject matter and may comprise of: vision impact stories, entrepreneurs' business information, business data and statistics, ongoing projects, future projects and a transactional exchange platform to manage and distribute funds.

Further, according to an embodiment, the content to be presented may be a show that focuses on entrepreneurs who bring ideas, inventions, technology, and innovative products to a panel of both foreign and American wealthy venture capitalists who are determined to change the world for the better by investing in socioeconomic solutions. The content may be interactive which allows the audience to participate in the ownership of companies presented in the show.

According to an embodiment, the TV Show 202 may be a pre-formatted full-featured TV providing content, which satisfies predetermined factors, that appeals to a strong engagement of the potential individual investor's (viewer's) senses and/or interests. These predetermined factors include but are not limited to a level of user's senses and/or interests, a level of relevancy of content to the user, prior investment/funding patterns of the user, prior history of interaction and engagement of the user with certain information, etc. For example, the TV Show 202 may be an energetic video show regarding a clean water project that is designed to trigger strong emotional engagement of the users' senses based on a high level of interest assigned to the users based on their previous electronic based interaction with clean water related data.

While TV Show 202 is described, the platform 200 may be configured to operate with any communication medium that can deliver content which includes audio and/or video. Using the TV Show 202 as an example, each episode of the TV Show 202 will showcase a number of companies (for example, four such social impact worthy companies) to present their business visions, background stories, founder stories and other due diligence information, etc. During each show, a panel of judges/investors can engage in a dialogue with representatives of the company such as company founders that can understand more about the company's and/or the project's growth plans and future trajectories. According to an embodiment, while the TV Show 202 is being presented to viewer(s), for example, the viewer 140 in the system 101 of FIG. 1, the platform 200 may provide an interface that enables communication between representative of the company or other participants of the show such as judges, presenters, etc. and the viewer(s).

On-demand content 204 of the platform 200 allows delivery of content (video and/or audio) on demand. Companies, businesses, individual entrepreneurs or other entities may showcase various information as part of interactive investing, funding and/or trading using On-demand content 204. For example, a company may showcase different dimension of the company's visions and stories which will be made available post each TV show for the audience, viewers and investors on web, OTT apps, social media platforms like YOUTUBE, FACEBOOK, etc. for further engagement.

Live webisodes 206 of the platform 200 allows delivery of content (video and/or audio). For example, the live webisodes 206 will enable company founders and representatives of other entities to engage periodically live with the audience via web, OTT apps, FACEBOOK/YOUTUBE live features where the audience or other interested parties can ask further questions via chat modules and founders can answer those queries. According to an embodiment, a person in the audience may present a question regarding a company, its project, etc., to another person such as a mentor who may be able to help the person in making a decision about taking equity in any of the project(s)/company(ies) presented during the show. The platform 200 may include specialized real-time chat capability or may incorporate functionalities of existing online chat interfaces which enable exchange of messages between a sender and receiver. While live webisodes 206 are used as an example of means to delivery of content, a webisode according to the invention may be viewed in real-time or downloaded for later viewing.

According to an embodiment, the platform 200 is configured to allow a person to obtain feedback from the audience for any decision making regarding project(s)/company(ies) presented during the show. For example, the audience can approve (thumbs up) or disapprove (thumbs down) any of the project(s)/company(ies) presented during the show. Moreover, a project for which a company is seeking funding according to content presented during the show may also be offered, by the platform 200, to the public including viewers that are not in attendance.

The platform 200 includes integration with Escrow and Bank Account 208 allowing companies, investors and other entities to have hassle free transactions and/or interaction. The transaction/interaction of the platform 200 will have tight integration to accept the investments and/or other equity in various different payment modes. The Escrow and Bank Account 208 enable transactions to be performed using secured credit card systems, bank accounts including but not limited to wire transfers, or other payment methods. The platform's 200 social media integration 210 allows creation and sharing of information, interests, etc., through virtual communities and networks. The social media integration 210 enables deeper connect of the companies seeking funds with audience which potentially can become active investors in the company. For example, ability to periodically put out different type of social media posts by companies allows a better visibility of the companies with their investor base.

As shown in FIG. 2, the platform 200 includes Project Campaign 212 allows companies and their founders (representatives) to showcase and highlight their projects and visions in more efficient way. While companies are in fund seeking mode, project campaigns 212 add on to their efforts by allowing company teams to maximize their visibility by engaging with audience or other interested parties on frequent basis, offering rewards and gifts and publishing the same on various social networks. For example, content of a project pertaining to creating open safe spaces for women and children may be electronically disseminated periodically through the Project Campaign 212 capabilities of the platform 200.

Equity offering and integration 214 of in FIG. 2 provides computing capabilities that allow investors to become part-owners of a company by trading capital for equity shares. The Platform 200 has system in place for investors to invest in the different companies and against that they will get the equity. Platform 200 through it's up to date Regulation and compliance 216 frameworks supports all the valid federal regulations and compliance needs. Some of the following are Reg A, Tier 1, Reg A, Tier 2, Reg S, Reg CF, 506 (c), 506 (b), 4 (a) (6) and US State Exemptions. All the KYC/AML exceptions will be regulated and covered using this module. For example, the platform 200 operates as the TGDP platform to initiate the AML ("Anti-Money Laundering") regulations for the companies (or) investor to detect and report suspicious activities on their existing transactions (or) settlements, terrorist financing, securities fraud and market manipulation. The AML process will validate the companies (or) investors majorly sectors like a) Monitoring the Transactions history for the Company/Investor. b) Large cash transaction deal for the Company/Investor c) As part of Know Your Customer (KYC) requirement, the due diligence checks will happen on various databases like bank, credit agencies, compliance software including the electronic verification for the positive confirmation of ID.

The platform 200, according to an embodiment, may include an informative multi-device application and a strong backend SEC and FINRA compliant exchange application infrastructure that handles funding and exchange transactions.

The Platform's 200 Engagement forum 218 will have multiple actionable sections for investors/users to get engaged and interact with company or another issuer where they have invested and hold the equity. Through the Engagement forum 218, interested parties including the investors/users can refer the available forums, blogs support system, refer the videos or send mail to companies offering. Forum comprises of various interactive channels like blogs, discussion forums, live chat and support, email communication, phone calls etc.

As shown in FIG. 2, the platform 200 includes Analytics 220 which captures data metrics in various dimensions that will be used to process investment. The Analytics 220 may include engagement metrics indicative of a level of engagement of a user (viewer) with content presented including the user's return to view the content, interaction with the content, etc., and other metrics that will facilitate investment processes. For e.g. the platform 200 will provide engagement metrics to companies, which will help them, identify what is working for them.

The Analytics 220 may include Investment metrics for investors that would help them identify company's likeability score which may be based on price to earnings ratio, debit, equity, cash flow, historical records of the company pertaining to previous ventures/projects, etc. Various other platform level analytics will help platform owners to improvise on platform specific features. According to an embodiment, the Analytics 220 involves obtaining information of a company including previous funding practices, a number of participants in the previous funding practices, capital attributed to the previous funding practices, etc., and quantifies performance by assigning a level, a score, a threshold, etc., to a company or a project.

The Platform 200 includes OTT App for smart phones and TV 222 which allows companies a far better and wider reach to audience. The OTT App for smart phones and TV 222 allows companies and/or other entities to access content in form on live, on-demand video on any device and from anywhere. While OTT App for smart phones and TV 222 is described herein as using the OTT App and smart phone and TV, the present invention is not limited to any particular type application or device. For example, any software application or service which is capable of distributing information over a network such as the Internet may be used to disseminate information of a company, business, entity and/or information a project. Audience viewers/investors can interact with company representatives, other fellow audience members right from their smartphone app or smart TV OTT apps using capabilities of the OTT App for smart phones and TV 222. This takes away the dependency from linear television shows and allows freedom to consume content whenever its needed creating a better synergy between the companies and investors.

As shown in FIG. 2, the Platform 200 may include Companies portal 224 which allows multi-level access control mechanism and user rights permission for key company stakeholders and/or other users of the company to access and update company information visible to external audience, viewers and investors. For example, the Companies portal 224 may be a website designed to provide access to various information of a company, the company's previous and pending projects, biographical information of company's decision makers, etc., and may provide email, text, and/or other communication services. The Companies portal 224 may comprise of mechanism to provide access to, update and review at least the following few key feature sets:
Offerings
Securities
CAP table
Email and notification
Reports
Company Profile
Media According to an embodiment, offerings include services, products, technology, projects, etc., offered by a company, securities include any financial instrument that hold some value such as monetary value, stock, etc., and CAP (capitalization table) includes ownership information such as ownership percentage, equity distribution, etc. The Companies portal 224 illustrated in FIG. 2 may provide capabilities of email and (other) notification, Reports and other information pertaining to the company and/or project, company profile and media information pertaining to the company, project and/or its affiliates. Any of these features of the Companies portal 224 may be presented to viewers and investors as actionable items of an on-screen decision matrix using which the investors may request additional information or make a selection which is described in detail below with FIG. 16.

While some exemplary features provided through the Companies portal 224 are indicated above, the Companies portal 224 is not limited to providing any type of information and may include any indicator, identifier and/or data pertinent to facilitating funding for a company when needed including capital information, limit on an amount of money the company is able to spend, financial reports, regulation compliance, earnings, asserts, etc.

Platforms' 200 Investor(s) Portal 226 allows investor to manage and track the investment and status of investment. Investor(s) can see the new updates for the companies/projects the investor(s) has invested or the companies the investor(s) is following.

Below are some key features for the Investors.
Dashboard
Investment
Holdings
Accreditations
Background check
Ledger
Payment
Documents According to an embodiment, dashboard is a tool for displaying indicators to the investors such as but not limited to status update of a project, funds available for projects, deadlines pertaining to projects, etc., and investment includes any information pertaining to an investment associated with an account of the investor, for example, a total number of current and previous investments of the investor, available investments offerings, etc. In an embodiment, the Investor Portal 226 may provide access to information of an investor including but not limited to holdings, accreditations, background check, ledger, payment and any other relevant documents. Any of these features of the Investor Portal 226 may be presented to investors in region(s) of an on-screen decision matrix as actionable items using which the investors may view investor and/or project related information, request additional applicable information or make a selection which is described in detail below with FIG. 16.

While some exemplary features provided through the Investor Portal 226 are indicated above, the Investor Portal 226 is not limited providing any type of information and may include any indicator or identifier of data pertinent to facilitating funding in a company for an investor including financial information, earnings, asserts, etc.

Figure 3:
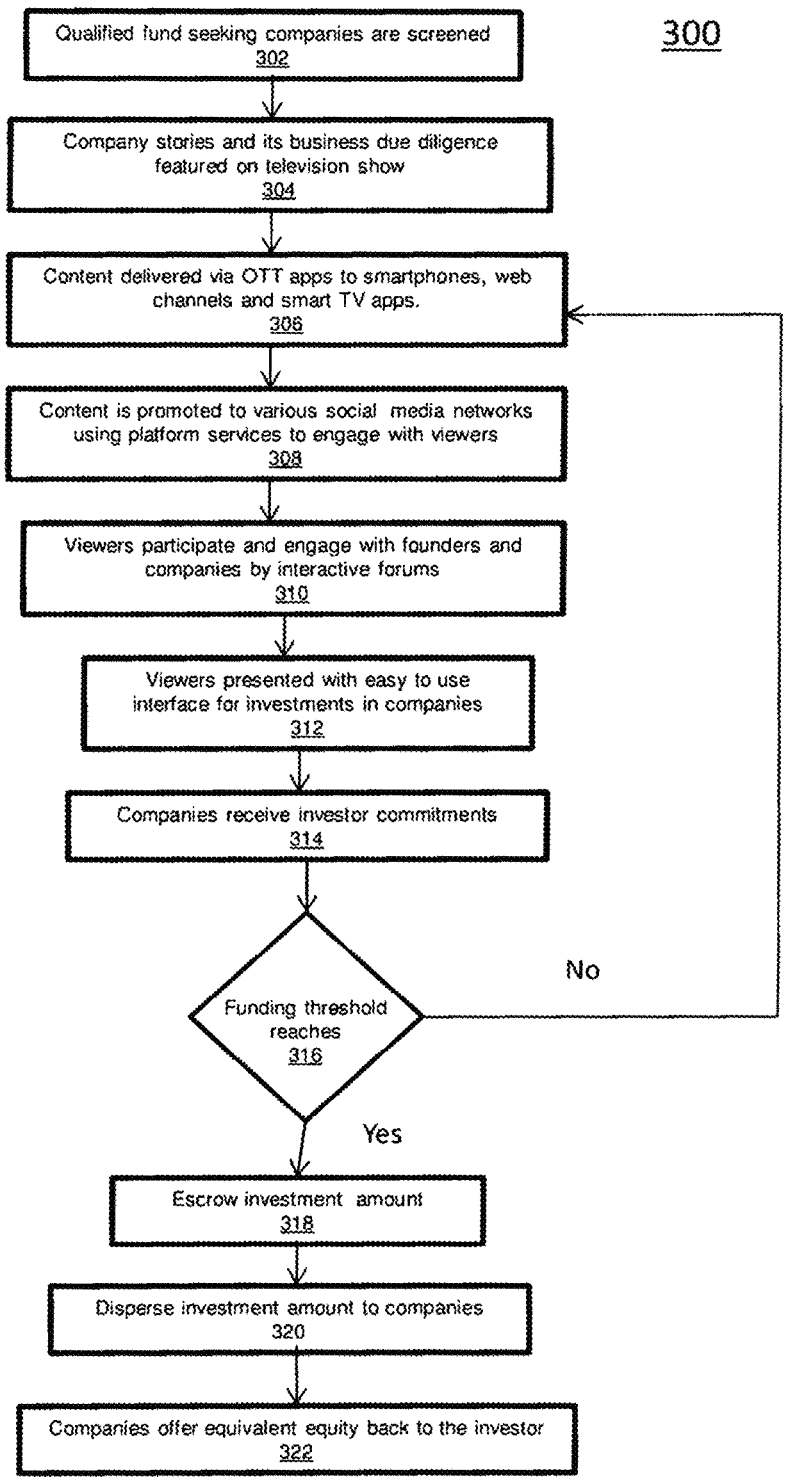
FIG. 3 shows an exemplary flowchart of a process of funding a company/companies according to one embodiment.

FIG. 3 depicts an example of a process 300 of seeking funding a company/companies according to one embodiment. Since the platform is intended to set a benchmark to bring forth the companies and entrepreneurs together, for example, in social impact areas, it's important that each such company is screened and qualified before officially being allowed to participate and raise capital using this platform. According to an embodiment, the process 300 includes operation 302 of screening qualified fund seeking companies. In operation 302, companies who are qualified are screened (determined) based on various different parameters. Such parameters include factors such as the company's involvement in a particular area such as social impact ideas, structure, business model, future projections, founders' background, intellectual property and other legal means of coverage for the product/technology/service, etc. which are used as parameters for screening the company's participation in the process 300 of seeking funding. For example, a higher numerical value may be assigned to a project of a company seeking funding according to high level of demand for product, service or technology represented by the project and reach/social impact of the project, and information of the project and the company may be on television show that the platform will broadcast as described earlier.

Subsequent to operation 302, the process 300 continues to operation 304, where company stories and business due diligence of each such qualified company will be featured on television show. At operation 304, information of the qualified companies and any other relevant information may be telecasted, and a television show may be produced for viewers, etc., where company founders may present their ideas, business plans, due diligence, and relevant information to audience. While operation 304 describes televising company stories and business due diligence as information of the qualified companies, any other relevant information featured in operation 304 using any form of communication.

After operation 304, the process 300 of FIG. 3 proceeds to operation 306, where information of the companies featured is made available via various different content bytes and information and delivered via OTT apps to smartphone, web channels and smart TV apps in form of on-demand videos. For example, once information of the qualified companies is officially aired on television show(s), content containing this information is delivered in operation 306.

Subsequent to operation 306, the process 300 continues to operation 308, company's and project's content will be promoted to viewer(s)/audience(s) through various social media networks to engage with viewer(s) using platform's social media services and/or other communication networks and services to expand the scope and reachability.

After promoting company's content in operation 308, the process 300 proceeds to operation 310, in which viewer(s) participate and engage with founders and companies by interactive forums. For example, viewers will engage with company stakeholders using interactive forum like live video, question/answer (Q & A) sessions, chats, comment boards, online videos, blogs and email services provided by the platform to further have a deeper connect with investment seeking companies. The process 300 continues to operation 312, to provide an interface to each such viewer(s) who want to participate and engage in communication and/or obtain additional information pertaining to investments in companies and/or companies' projects. The viewer(s) can freely access a web based interface where they can sign up and become active investors by going through required compliance checks and accreditations. For example, a viewer may register to open an account with the platform 200 by going through identity verification (name, address, social security or other identifier), financial and fund information, etc. Once through, such investors can commit their investments to company.

The process 300 continues to operation 314 where companies receive investor commitments. These commitments are in forms of investments received by the fund seeking companies on the platform, such as the platform illustrated FIG. 2. Once viewer(s) make a decision to fund the project using the interface presented 312, an account of the company seeking funding may be credited with a value from the inventor(s). Such receipt of investor commitments in the operation 314 may be an electronic transfer of money from an account of the investor's to the company's account. However, any form of payment toward the project for which the company is seeking funding may serve as receipt of investor commitments by the companies in operation 314.

Subsequent to receiving investor commitments in operation 314, the process 300 proceeds to operation 316. Operation 316 determines whether companies seeking funding have reached a funding threshold. Companies may seek funds till funding (investment) threshold is reached at operation 316. Once the threshold is reached, all the investments will be credited to escrow accounts (or other similar accounts) at operation 318. Alternatively, if the funding threshold is determined to not have been reached at the determining in operation 316, the process 300 returns to operation 306.

At operation 320 of the process 300, investment amount to companies is dispersed. According to an embodiment, on the approval and affirmation from applicable stakeholders, company's bank account will be credited with investment commitments including applicable monetary value that corresponds to investment commitments received so far in escrow.

Subsequent to operation 320, the process 300 proceeds to operation 322, companies offer equivalent equality back to the investor where the pre-determined equity or royalty and/or consideration is allocated against the capital raised to invested individuals and firms. While the process 300 illustrated in FIG. 3 is illustrated from a company's point, the process 300 may be performed by any other entity using any combination of software component(s), hardware component(s) and/or any combination thereof.

Figure 4:
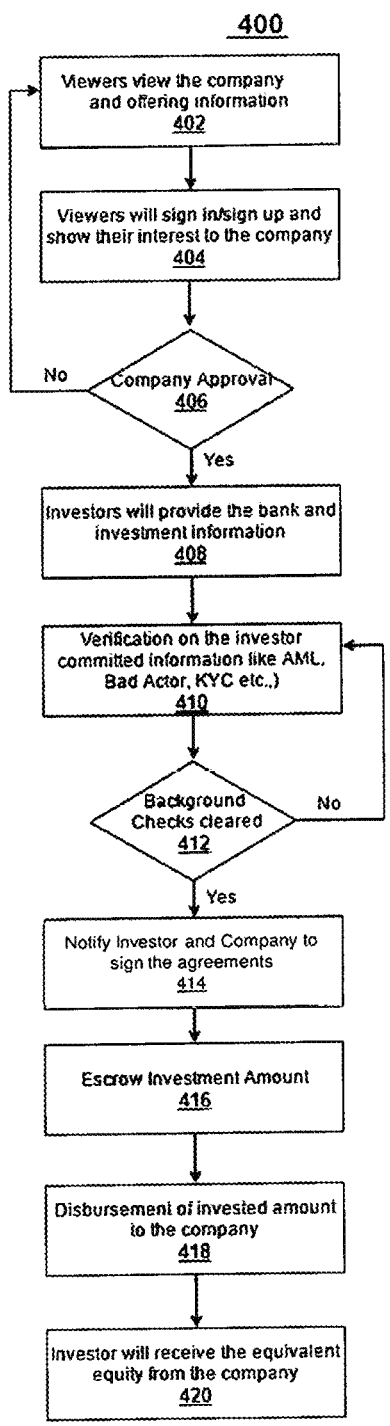
FIG. 4 shows an exemplary flowchart of a process of an investment by an investor according to one embodiment.

FIG. 4 shows an exemplary flowchart of a process 400 of an investment by investor(s) and operation(s) executed for an investment in a company showcased on a platform according to an embodiment. As shown in FIG. 4, process 400 beings with operation 402, viewers view company and offering information. The operation 402 in which viewer(s) view company and offering information may be through televised shows, live and on-demand contents made available on smartphone apps, OTT apps, social media networks and/or other content delivery mechanisms. Using TGDP platform, the viewers will be able to view the company and offering information. For example, company A's project needing funding and potential equity interest offered by company A in exchange for the funding may be televised to viewer(s).

Subsequent to viewer(s) viewing company and offering information in operation 402, process 400 proceeds to operation 404, where the viewers are prompted to sign in/sign up and show their interest on the offering to the company with all the basic information. Using the same example company A as in the previous paragraph, a person (viewer) who has viewed the company A's project may sign in/sign up (register) using an investors portal 226 of the platform 200 in FIG. 2. While the investor portal 226 may be used as an example for indicating interest in a company, the present invention is not limited to using the same. For example, interest in a company may be indicated by any other electronic system which is communicatively coupled to the platform 200.

The process 400 continues to operation 406, which determines whether a company has approved the interest shown by the viewer(s). In operation 406, the company's executives may receive a notification of a request of interest to participate in funding of the company's offering indicated by viewer(s) and validate the request. According to an embodiment, approval of the interested viewer(s) may be based on various factors considered by the company including but not limited to interest demonstrated by the viewer(s), a level of expertise of viewer(s) in the subject matter of a project indicated in the offering information, prior investment/funding patterns of the viewer(s), prior history of interaction and engagement of the user with certain information, etc.

When determining approval at operation 406, the viewer(s) as candidate investor(s) will receive the notification towards the offering and is able to proceed forward for the investment. When no approval at operation 406, for example, in case of any faults, a notification will be sent to the viewer(s) and the process 400 returns to the operation 402. In operation 408, on successful approval at operation 406, the Investor, as candidates, will continue the investment process by providing information such as bank and investment information. This information may include but is not limited to the bank details, amount to invest, total share, proof of documents etc., which is submit to the company.

After operation 408, the process 400 proceeds to operation 410 of verification on the investor committed information. For example, the TGDP platform will notify the investor information to company, and the submitted information/documents will be processed for the securities like AML, Bad Actor, KYC, Bank Account verification etc., In operation 412, the process 400 determines whether background checks clear. Any known background checking processes may be used to verify the background checks. Upon determining at operation 412 that the background checks got cleared, the investor and company will be notified for the agreement signing at operation 414. In case of any faults in which the background check has not been cleared at operation 412, the process 400 returns to operation 410. In the case that the background check has not been cleared at operation 412, notification may be sent to the investor with valid (detailed) reasons. In operation 414, on successful approval at operation 412, the company and investor will sign the subscription agreements.

Subsequent to operation 414, the process 400 proceeds to operation 416, the proposed investment from the investor will be credited to Escrow account based on approval from the respective parties. In operation 418, disbursements of invested amount are made to the company where an amount will be credited to company's bank accounts. In operation 420, investors will receive from companies equivalent equity or royalty against their investment. For example, an investor may invest $10,000 and take 1% equity interest in a company and/or agree to take a percentage of royalty from each sale of a product of the company. An investor as described herein may be any person or user, or any other entity which capability to provide funding to a company to take equity interest in the company or the company's project.

Figure 5:
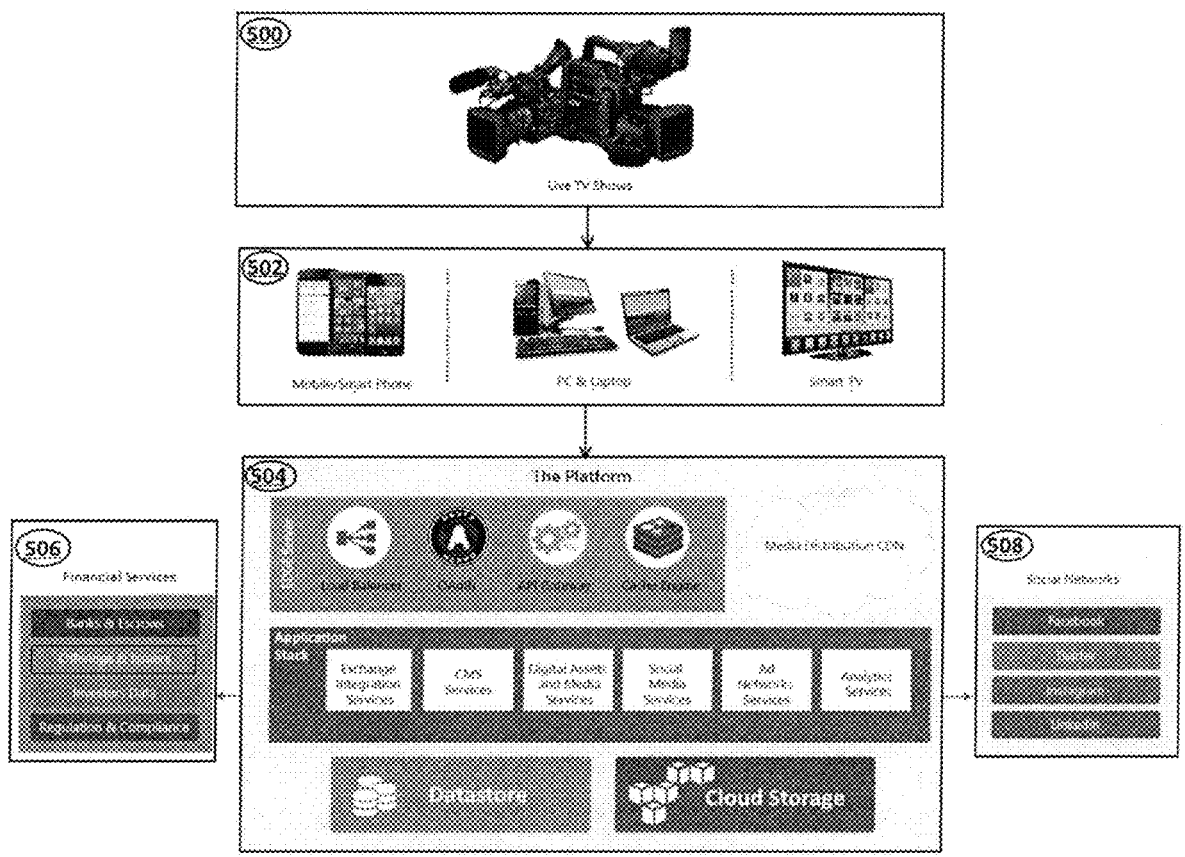
FIG. 5 shows example software architecture and technical components of a platform according to an embodiment.

In FIG. 5, shows example of a software architecture and various technical components of a system 520 associated to funding platform 504 along with key software systems and services. While FIG. 5 illustrates software and services, the system 520 may be implemented using software component(s), hardware component(s) and/or any combination thereof.

At 500, television shows will be produced and telecasted that will highlight an existing company and/or launch companies. For example, a TV show may be produced directed to a company's project and content may be displayed through the TV show that includes not only information relevant to a project run by the company but also the company's earnings, profit, stakeholders, etc., and other information relevant to the project. Any content or program, audio and/or video that can be broadcast by a television may be considered a TV show.

As mentioned above, the TV show may be displayed through any content delivery device in real-time and/or on-demand. At 502, all or part of the content (such as live and on-demand videos) will be distributed via OTT apps on smartphone, web apps and/or connected (smart) TVs, for example. The TGDP OTT Apps provides better and wider reach between the companies and the audience. The companies will be able to manage the content in form on live, on-demand video on any device and from anywhere, and the investors can access the information and easily interact with company executives right from their smartphone or smart TV OTT apps.

At 504, examples of the system's software components are highlighted. Software components of the system 520 include of edge servers that comprise of load balancers, secure authentications servers including Open Authorization such as OAuth, Application Programming Interface (API) gateways, and cache engines. Component of the system 520 also include content distribution networks like cloud front systems. According to an embodiment, the system 520 comprises of data stores for storing companies' information, investors information, etc. and cloud based storages for documents, images, and other data, etc. Application stack highlights the various business layer integration with exchange integration services, content management system (CMS) frameworks, digital assets and media services, ad networks and analytics services. The platform's, such as the TGDP's, CMS platform allows the multi-level access control mechanism and user rights permission for key company stakeholders to access and update company and/or project information visible to external audience and investors, and also it helps to ingest and control media content distribution including documents, video and live broadcast sessions to wider range of devices. At 506, financial services integrations are highlighted which include (3rd party) banks, escrow companies, offerings and issuers, investor data, and regulation and compliance framework. At 508, platform's social network integration services allow platform to exchange and publish data on various different networks including but not limited to FACEBOOK, TWITTER, INSTAGRAM and LINKEDIN.

Figure 6:
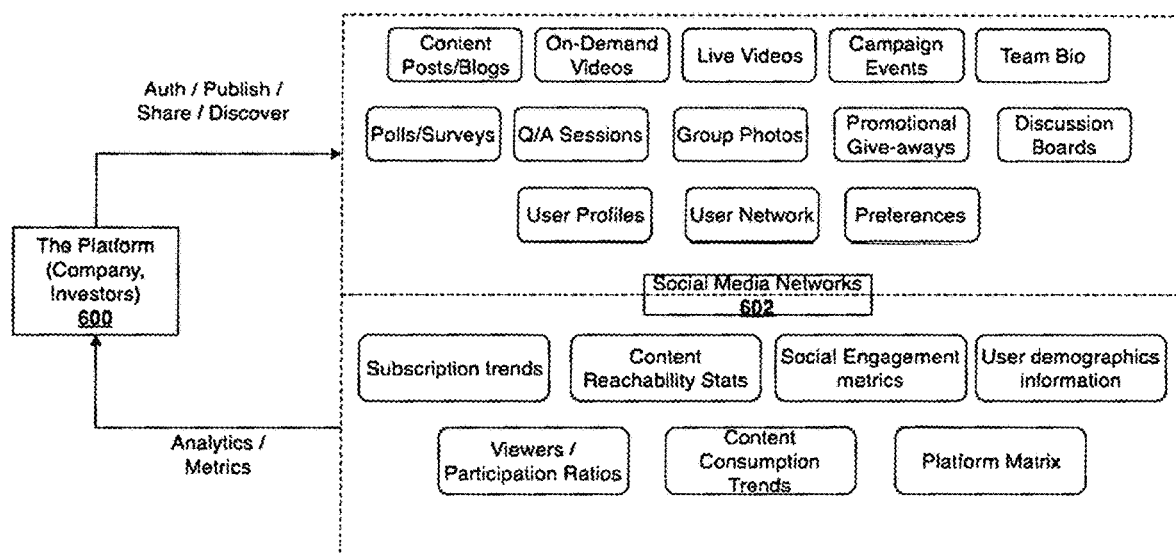
FIG. 6 shows an example of integrated services of a platform according to an embodiment.

In FIG. 6, shows an example of integrated services of a platform including network integration 610 which includes the role of social network integration with platform. Social media platform will help to get more visibility to companies, engagement on various different aspects and will result into wider investment spectrum from viewers. Operation(s) of the network integration 610 and the platform 600 illustrated in FIG. 6 may be implemented using software component(s), hardware component(s) and/or any combination thereof. The platform 600 as a system comprises of entity investors, companies and viewers that would allow deeper integration capabilities with social media networks 602 (FACEBOOK, TWITTER, LINKEDIN, SNAPCHAT, INSTAGRAM, etc.) by allowing an ability to post, publish, share and discover content. Companies can post content in various forms like blogs, content posts, pictures, live and on-demand videos, group photos, etc. Companies can engage with audiences and investors on social media networks via surveys, polls, Q/A sessions, discussion boards etc. Investors can sign themselves up via social network credentials and can further post their preferences, company likings on these social networks. Social media networks 602 with its API services would provide all the required engagement metrics, analytics information about viewers, content reach and engagement stats etc. This will help companies and platform to understand how audience is reacting to show and what is trending and what's not. This will give low-level insights into market segmentation, market preferences and conversion metrics from being a viewer to investor in the company. While Social media networks 602 is used as an example of a network for the network integration 610 in FIG. 6, the present invention is not limited to any type of network that has communication functionality which allows information, services, resources, etc., to be exchanged and/or shared and includes networked computing devices that are connected through wireless or wired communication.

Through the network integration 610, the platform presents (displays) actionable items through which companies and users as potential investors can connect and communicate with each other. As shown in FIG. 6, the actionable items are operable for authorization, publication, sharing, decision making and discovery functions. The actionable items include content posts/blogs, on-demand videos, live videos, campaign events, team bio, polls/surveys, Q/A Sessions, Group Photos, Promotional give-aways, discussion boards, user profiles, user network, preferences.

The network integration 610 of FIG. 6 includes analytics/metrics functionality which operate to provide subscription trends, content reachability stats, social engagement metrics, user demographics information, viewers/participation ratio, content consumption trends and platform matrix. The analytics/metrics functionalities enable companies and/or users as investors to obtain various analytics and metrics pertaining to a company, a user, a project, etc. For example, the system maintains a record of users' interaction with a company's content post/blogs and/or campaign event regarding a particular project of the company and identifies the one with the most number of users' interaction (or interest).

Figure 7A:
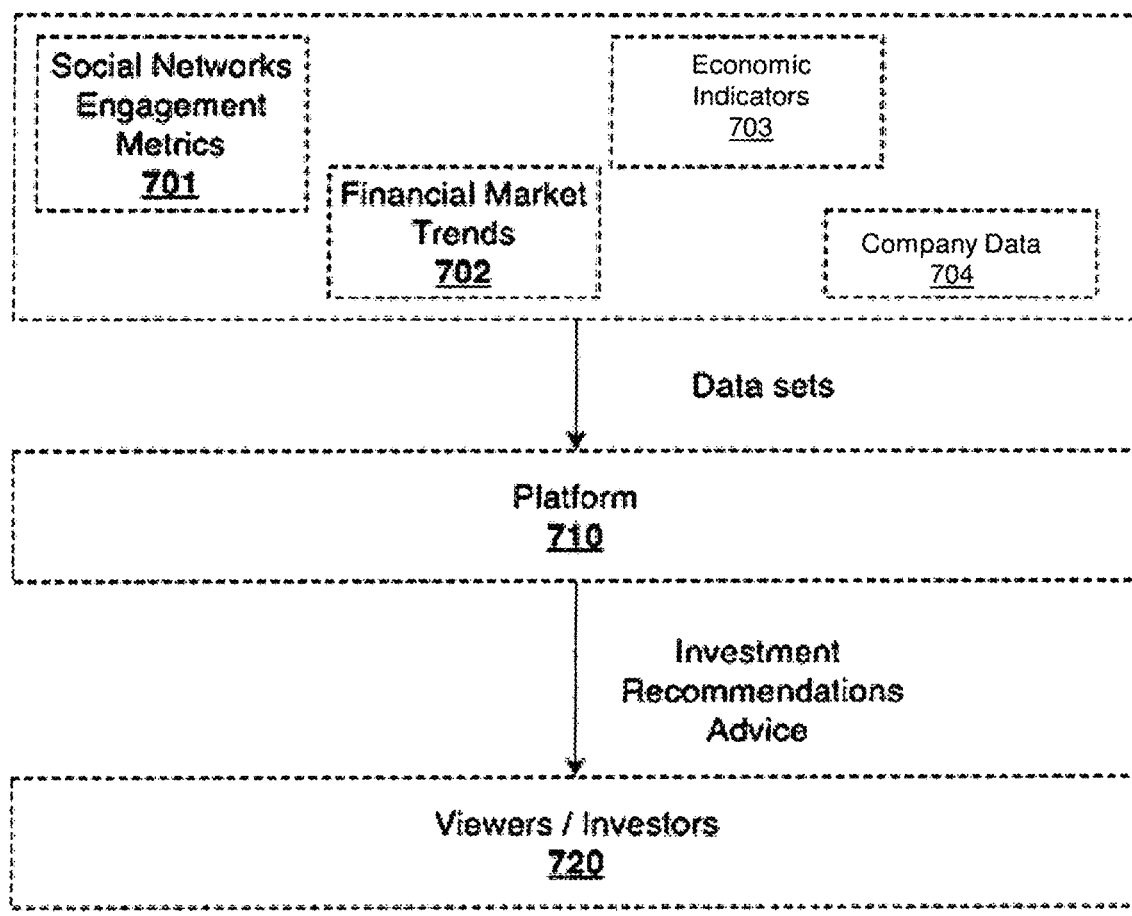
FIG. 7A is an example of data aggregators useable for investor recommendations generated by a platform based on various data segments according to an embodiment.

FIG. 7A shows an example of data aggregators useable for investor recommendations (on-screen decision matrix) generated by a platform based on various data segments, according to an embodiment. Data aggregators 700 illustrate how the platform can enable an investment predictive model that can help investors/viewers to understand the company parameters more simply. Various input data aggregation services are represented as 700 formed by various analytics sources like social networks engagement metrics 701 of various platform listed companies, financial market trends 702, economic indicators 703 such as micro/macro-economic indicators, company data 704 of fund seeking company including due diligence data is fed to the platform 710. Based on these data inputs, the platform 710 can intelligently enable a predictive model based on qualitative/quantitative data sets and provide the viewers/investors 720 relevant recommendation advices. This empowers a regular viewer with more accurate and in-depth information on company dynamics making him more informed investor.

According to an embodiment, the platform 710 compresses the process of raising funds to an on screen decision matrix that presents several types of information utilizing artificial intelligence algorithms and data pulls according to the data aggregators 700. Using the data inputs, the platform 710 seeks out potential investors based on a variety of investor health monitoring metrics including portfolio health, investment risk tolerance and type of investment category. The economic indicators 703 may include information captured from a user (viewer) application, credit information and any other relevant information of the user.

The platform 710 may utilize artificial intelligence algorithms based selection process through a recommendation engine that will guide a potential investor to make a decision tailored to the potential investor's investment profile including risk tolerance. For example, using input data aggregation services a computer will pull a data source including the following chunks: customer identifying information, project financial metrics as reported by the project company, past performance indicators, expert third party investor input pertinent to the project, residence of investor to conform with investment law and push an appropriate video stream of a show and other supporting videos about the project that are all selected by the AI algorithm and the data call. The computer will process and aggregate the data structures from various sources guided by the AI recommendation engine and present pieces of information and display each one with actionable zones for further information.

Figure 7B:
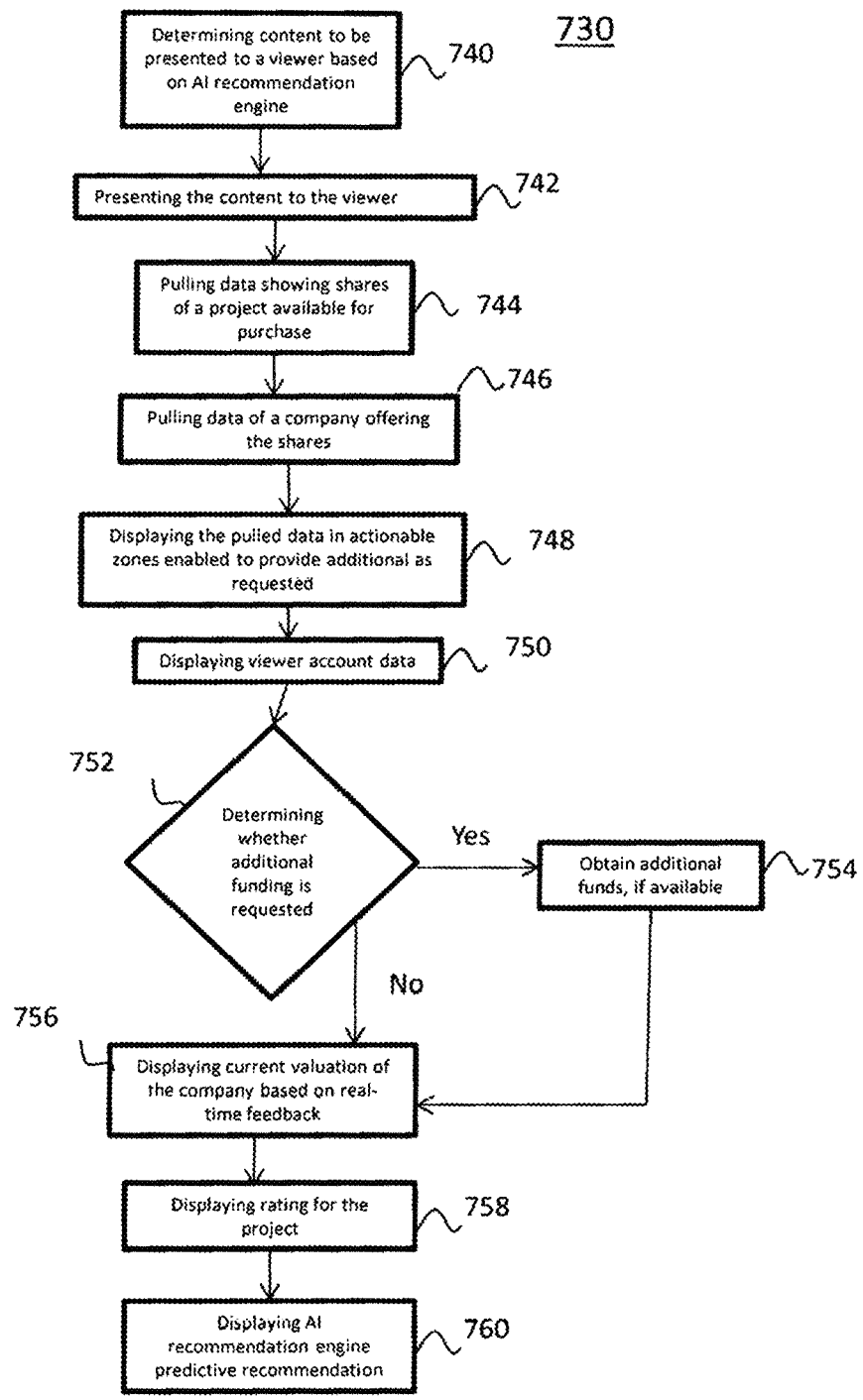
FIG. 7B is an example of a process of a recommendation engine generated by a platform according to an embodiment.

An exemplary process 730 of a recommendation engine generated by a platform for funding for a project is illustrated in FIG. 7B. As shown in FIG. 7B, process 730 begins with determining 740 content to be presented to a viewer based on a recommendation engine such as an artificial intelligence (AI) recommendation engine. For example, the data aggregators 700 shown in FIG. 7A may be used to determine which of contents available for viewing should be presented to a viewer in a certain geographical location. Further, the AI recommendation engine may recommend showing a particular video in the viewer's residence area (allowing for future multiple concurrent TGDP broadcasts in many countries).

Subsequent to the determining 740, the process 730 proceeds to presenting 742 the content to the viewer. In this instance, the content may be an interactive emotional video of a show transmitted through televisions, websites, connected smart television OTT applications and handheld smart phone applications.

After presenting 742, the process 730 continues to pulling data showing shares 744 of a project available for purchase and subsequently to pulling data of a company 746 offering the shares that are available. For example, a numerical value identifying shares of the project available for purchase may be pulled from an exchange platform. At operation 746, data is pulled on background material on the company including press releases, third party opinions and related industry news and shared on the on-screen decision matrix based on an AI recommendation engine algorithm and available at a click for added research by the viewer if required.

Data may be pulled that identifies the viewer, the company and the project, project financial metrics, past performance indicators, expert third party investor input pertinent to the project, etc., for processing as guided by the AI recommendation engine, and displayed to a viewer through on-screen decision matrix via a display of a device.

The process 730 continues to displaying the pulled data 748 in actionable zones (regions of an on-screen decision matrix) enabled to provide additional information as requested. Any of the information pulled at operations 744, 746 can be displayed at operation 748 using actionable zones through which additional information may be requested.

Subsequent to displaying the pulled data 748, the process 730 proceeds to displaying viewer account data 750. The viewer account data is retrieved using a unique identifier of the viewer and the retrieved data is displayed. For example, an amount of funding that is readily accessible to a viewer based on amount of funding that is available is displayed in one of regions or zones of an on-screen decision matrix displayed on a screen of a device being used by the viewer.

As shown in FIG. 7B, the process 730 continues to determining 752 whether additional funding is requested. Upon review of the account data displayed at 750, the viewer may choose to request additional funding for the purchase of shares. When determining that additional funding is requested at operation 752, process 730 proceeds to operation 754 to obtain additional funds, if available. Additional funds that can be accessed from financial institutions or other means that can loan money to the viewer are presented at the same instance. If determining at operation 752, no additional funding is requested, the process 730 proceeds to displaying current valuation 756 of the company based on real-time feedback. Based on real-time feedback into the system, the current valuation 756 of the funded company can change based on variables fed (or pulled) from several data sources including speed of share acquisition by viewers (higher demand may increase the valuation of a project).

After displaying current valuation 756, the process 730 continues to displaying rating 758 for the project. According to an embodiment, the rating may be a real time project rating by experts which provides opinions by expert investors. The real time ratings by each individual investor can go up and down based on the data being discovered by the experts. However, the viewers always have the ability to over-ride the expert decisions and proceed with placing a transaction.

After displaying rating 758 for the project, the process 730 continues to displaying AI recommendation engine predictive recommendation at operation 760. According to an embodiment, the AI recommendation engine executes a predictive "strong" or "medium" buy recommendation based on market data gathered including macro trends, specific project performance and company executive experience, past performance, etc. Accordingly, the platform pulls data of various sources which the Artificial Intelligence recommendation engine combines to provide a new way of investment decision making to the general public adding factors that were not easily or readily available and discernible.

Moreover, according to an embodiment, in regards to a project presented in a TV show, the predictive recommendation displayed at 760, may be combined with feedback obtained from an audience of a show. For example, an indicator identifying the audience's approval (thumbs up) or disapproval (thumbs down) of the project presented in the TV show may be displayed in one of regions (zones) of the on-screen decision matrix displayed on a screen of a device being used by the viewer while another one of the regions (zones) of the on-screen decision matrix displays the AI recommendation engine predictive recommendation of operation 760.

Figure 8:
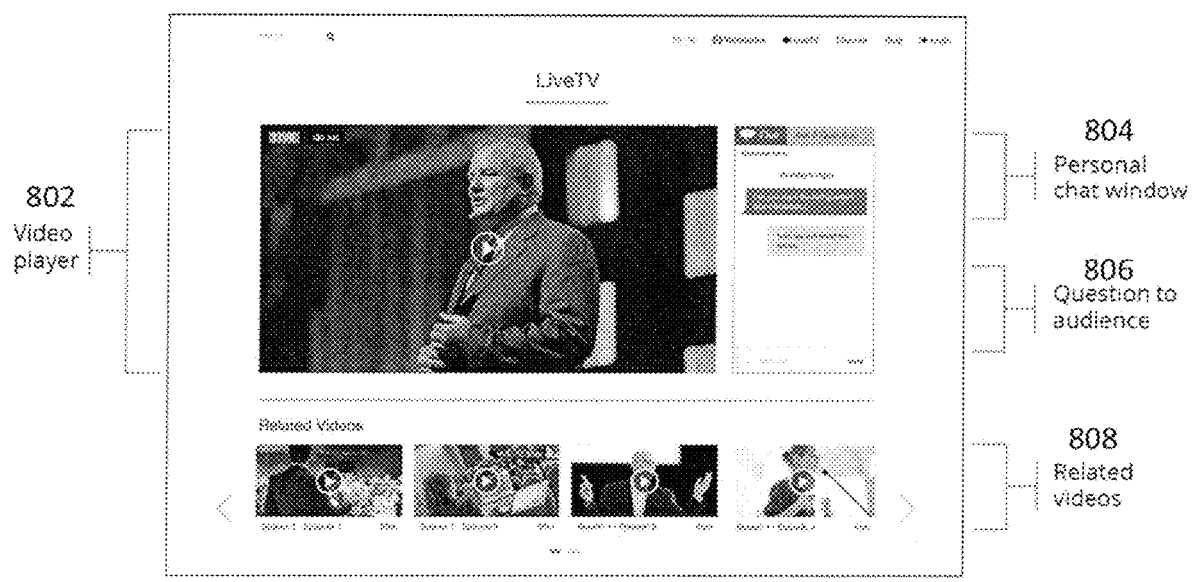
FIG. 8 is an example of an interface according to an embodiment.

In FIG. 8, shows an example of an interface having a display area 800 provided through the platform from where companies can do a live broadcast using a video player 802 to promote their project/company according to an embodiment. These broadcasts can include a CEO broadcast, a town hall event, or any other event happening relevant to the company. Along with the live broadcast, viewers have the option to chat with the team regarding any information they might be seeking about the project through a personal chat window option 804 displayed via the display area 800. The viewers also have the option to ask a question related to the broadcast or the company through question to audience option 806 displayed via the display area 800. Viewers also have the option to view the videos which were previously broadcasted through related videos option 806 displayed via the display area 800. FIG. 8 shows a display area of a display (display apparatus) according to a process as described herein which may be implemented using software component(s), hardware component(s) and/or any combination thereof.

An exemplary embodiment of the display area 800 shown in FIG. 8 enables an investor (user) or another entity to participate in funding that is associated with a company, business, etc., by providing an interface using which the investor, for example, may view content related to the company and engage in communication with representatives of the company.

Figure 9:
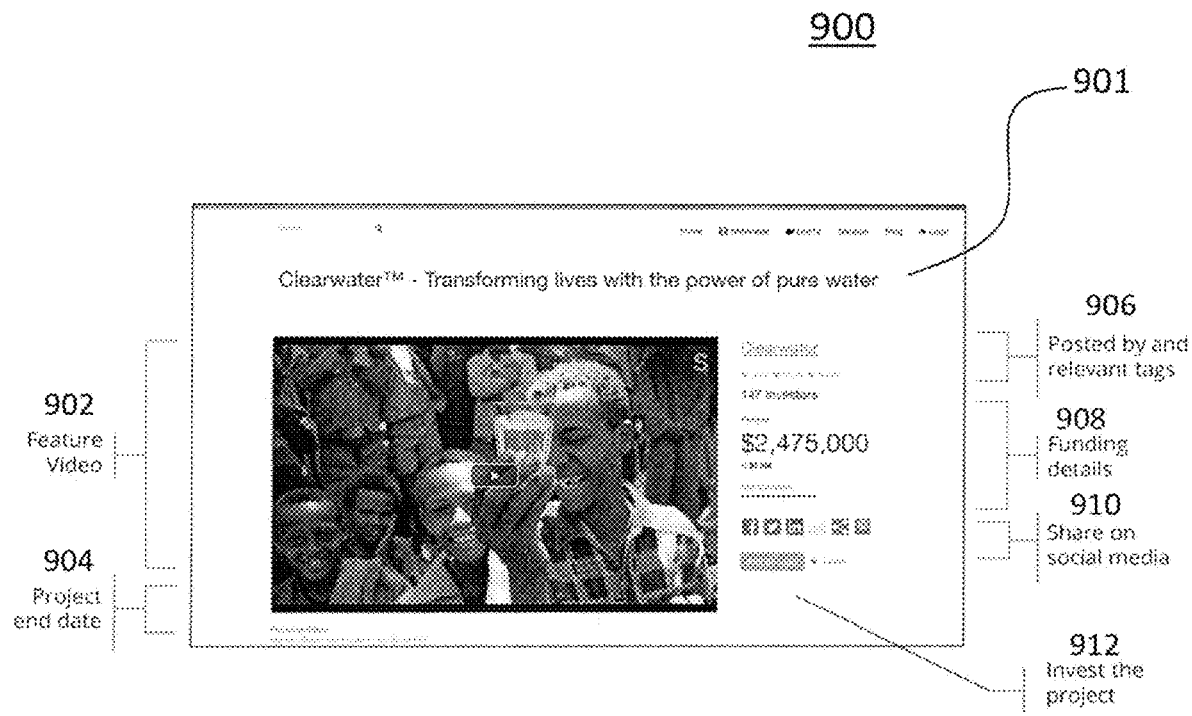
FIG. 9 is an example of an interface according to an embodiment.

In FIG. 9, shows the example of an interface including a web interface 900 of the platform where viewers can view and access investment/funding details that the company is seeking as well as a feature video 902 featuring a company and/or a project of a company. The company's featured video 902 may be prominently displayed to present the viewers a clear idea what the company is about and the project they are seeking investment for. The company/project name identifier 901 along with tag line is displayed as the heading along with the relevant tags that the project is associated with.

The web interface 900 includes actionable zones such as post identifier and relevant tags 906, funding details 908, options for sharing on social media 910 and option for investing in the project 912. As shown in FIG. 9, the funding (investment) details 908 clearly indicate to the user how much investment the company is seeking and the amount that is pledged till date. The viewers also get an idea about the percentage successfully pledged by other investors. The project end date 904 indicates when the time frame within which the company is seeking the investment. Viewers have the option to share these project details on various social media platforms or email the details to another potential investor. Viewers have the option to "Follow" the company for future updates. Once the viewers decide to invest in the company, they can click on the "Invest Now" button to proceed to the next steps. FIG. 9 shows a display of a process as described herein which may be implemented using software component(s), hardware component(s) and/or any combination thereof.

While FIG. 9 is illustrated with relevant tags 906, funding details 908, options for sharing on social media 910 and option for investing in the project 912 as actionable zones, the present invention is not limited thereto. For example, the web interface 900 may be displayed with other actionable zones that may be triggered to access data from plurality of sources and/or perform operation related to the accessed data in response a request by the viewer. The actionable zones may operate as selectable options or commands presented to the viewer of a computer, portable device, or TV. According to an embodiment, all actionable zones may be presented to a viewer or only part of the actionable zones may be presented to the viewer. For example, if a profile of the viewer reflects that the viewer does not use social media networks, social media based communication may not be presented in the actionable zones presented to such viewer.

Figure 10:
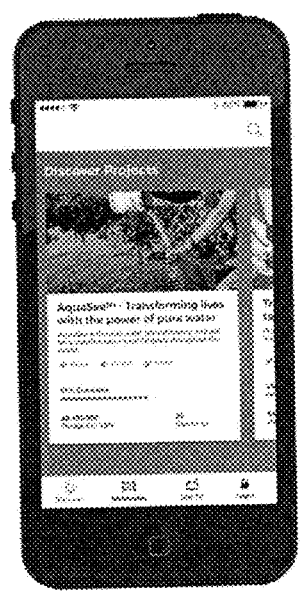
FIG. 10 is an example perspective view of an application communicatively coupled to a platform according to an embodiment.
Figure 10:
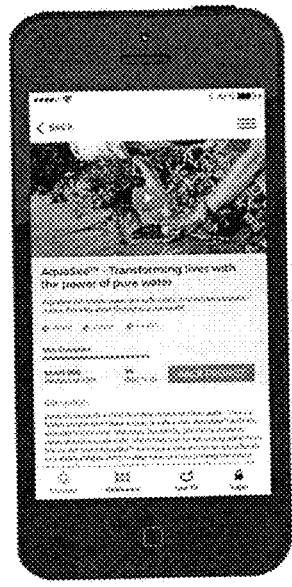
Figure 10:
Figure 10:
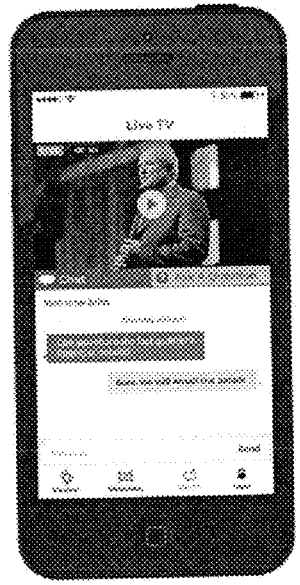

FIG. 10 is an example perspective view of an application communicatively coupled to a platform according to an embodiment. In FIG. 10, shows the example of a mobile interface 1000 of the platform from where users can access the details of the company seeking investment via a mobile device or other portable devices. On launching the application, following the splash screen (not shown), users can view the list of available projects 1002 available for investment. Each project clearly displays the image related to the project, the title and brief description about the project, along with the relevant tags that the project is associated with. Users also get a quick preview about project (investment) detail indicators 1004 including but not limited to how much investment the company is seeking, the amount that is pledged till date, etc. The viewers also get an idea about the percentage successfully pledged by other investors. Clicking on any project from the list of available projects 1002, users will be able to view the project details 1004 along with the company's featured video that is prominently displayed to present the users a clear idea what the company is about and the project they are seeking investment for. The company/project name along with tag line is displayed as the heading along with the relevant tags that the project is associated with. The investment details clearly indicate to the user how much investment the company is seeking and the amount that is pledged till date. The viewers also get an idea about the percentage successfully pledged by other investors. Once the viewers decide to invest in the company, they can click on the "Invest Now" button to proceed to the next steps. By clicking the "Webisodes" icon 1006 in the bottom menu bar, users have the option to view the webisodes, which were previously broadcasted. For ease of recognition, for each webisode, users are presented with a thumbnail icon of the webisode along with the title and brief description of the contents of that webisode. By clicking the "Live TV" icon 1008 in the bottom menu bar, users have the option to view the live broadcast, which the company is doing to promote their project/company. Along with the live broadcast, users have the option to chat with the team regarding any information they might be seeking about the project. The users also have the option to ask a question related to the broadcast or the company. FIG. 10 shows a process of the mobile interface as described herein which may be implemented using software component(s), hardware component(s) and/or any combination thereof.

Figure 11:
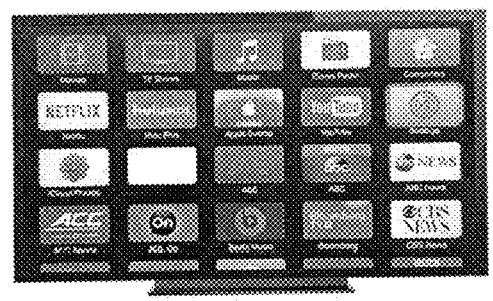
FIG. 11 is an example perspective view of an application of a Smart device according to an embodiment.
Figure 11:
Figure 11:

In FIG. 11, shows example of an application of a smart device including an interface 1100 which includes OTT Smart TV apps 1102 of the platform available on popular streaming devices which may be implemented using software component(s), hardware component(s) and/or any combination thereof. According to an embodiment, on entering one of applicable the applications 1102, the Webisodes listing 1104 is displayed on the screen from where users have the option to view the webisodes that were previously broadcasted. Viewers are presented with a thumbnail icon of the webisode, the title and brief description of the contents of that webisode along with the duration of the webisode. As shown in FIG. 11, viewers may also select from among channels 1106 available through the interface 1100.

Figure 12:
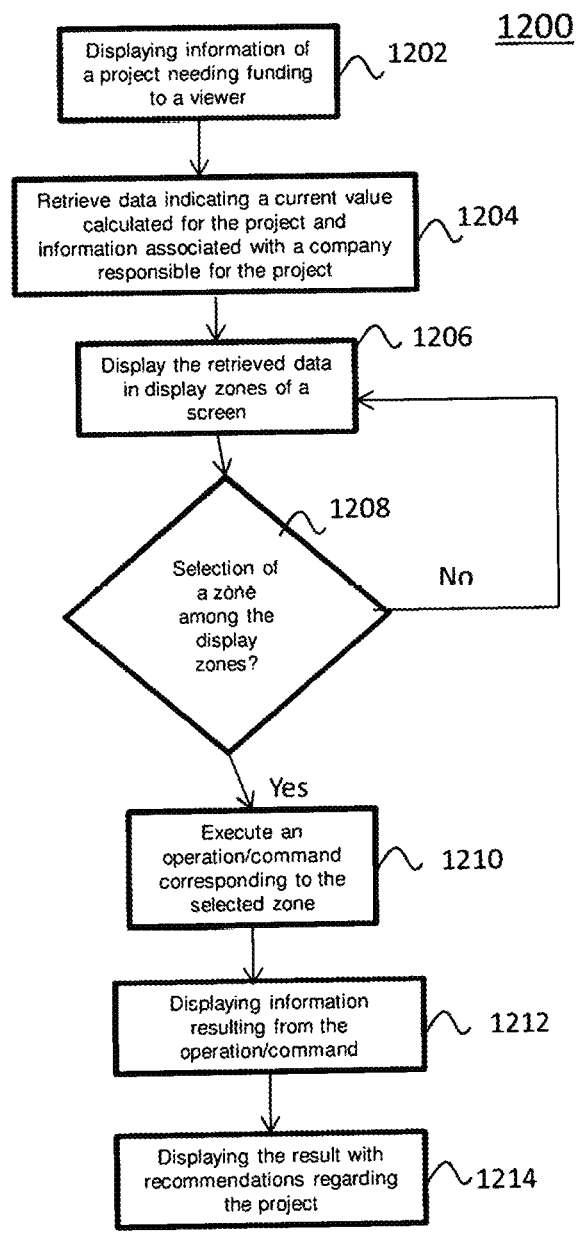
FIG. 12 is an example of a process of funding a project according to an embodiment.

An exemplary process 1200 of funding for a project is illustrated in FIG. 12. As shown in FIG. 12, process 1200 begins with displaying 1202 information of a project needing funding to a viewer. As previously discussed, content including audio/video may be displayed (presented) to the viewer. For example, a user (viewer) is provided with information of a company which is interested in obtaining funding for a project using an on-screen decision matrix.

Subsequent to displaying 1202 the information of a project, process 1200 continues to retrieve 1204 data indicating a current value calculated for the project and information associated with a company responsible for the project. The data retrieved 1204 indicating the current value may be calculated based on various parameters including but not limited to investor expectations of a company's future earnings, liquid asset of the company, the company's market capitalization, analyzing comparable companies, etc.

After retrieve 1204 data, the process 1200 of FIG. 12 proceeds to display 1206 the retrieved data in one of a plurality of regions of a screen displayed on a display apparatus. The plurality of regions of a screen is explained in detail at least in FIG. 16.

As shown in FIG. 12, after display 1206 of the retrieved data, process 1200 proceeds to determination of whether selection 1208 of a zone among the display zones occurs. The retrieved data at 1204 in displayed in display zones where at least one of the zones is selectable by the viewer.

When the determining 1208 indicates no selection of a zone has been made by the viewer, the process 1200 returns to displaying 1206 of the retrieved data. Upon determining selection of a zone at 1208, process 1200 proceeds to execute 1210 an operation and/or a command corresponding to the selected zone. Any one or more operation and/or command may be implemented in accordance with operation of 1210. The operation and/or command may be to pull data showing a current value of a project, available shares for purchase, data of company/project, third party opinions and rating of company/project, approval/disapproval of the company/project from AI recommendation engine algorithm, etc. While some examples are provides herein, the operation and/or command executed at operation 1210 is not limited thereto and may be operated to execute any of the functions described herein.

The process 1200, after execution 1210 of an operation and/or a command, continues to operation 1212 of displaying information resulting from the operation and/or a command. After operation 1212 of displaying, the process 1200 continues to operation 1214 of displaying the result with recommendation regarding the project. According to an embodiment, the recommendation regarding the project in the operation 1214 is based on relevant quantitative/qualitative analysis of data gathered based on the various engagement statistics including but not limited to from social media, financial market trends and online platforms. The recommendation generates a predictive model that can advise and educate viewers to participate and invest in companies.

Figure 13:
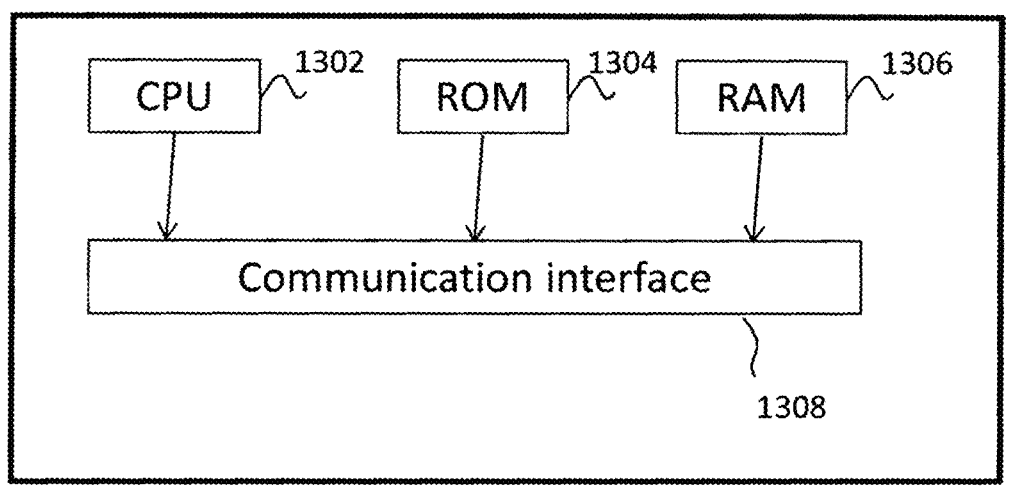
FIG. 13 is an example of a functional block diagram of a hardware device executing a process according to an embodiment.

FIG. 13 is an example of a functional block diagram of a hardware device executing a process of funding according to an embodiment. As mentioned above, any hardware device may be used to implement a process of the present invention such as a desktop or laptop computer, a handheld/portable device such as a personal digital assistant (PDA), mobile phone, and a specialized terminal, or any machine that is enabled to electronically send/receive information. As illustrated in FIG. 13, a device 1250 may include a central processing unit (CPU) 1302, a memory such as a read-only memory (ROM) 1304, a random access memory (RAM), and a communication interface 1308. An operating system (OS) and an application program that is used to execute a process in an embodiment may be stored in a hard disk drive of the device 1250 and read from the hard disk drive when the OS and the application program are executed by the CPU 1302. The CPU 1302 performs control in accordance with a processing content of the application program to cause a display (not shown) and the communication interface 1308 to perform a certain operation(s). In an embodiment, the application program that is used to execute the process described herein. Any program described herein may also be stored in a computer-readable removable disk to cause the device 1250 to execute a process.

Figure 14:
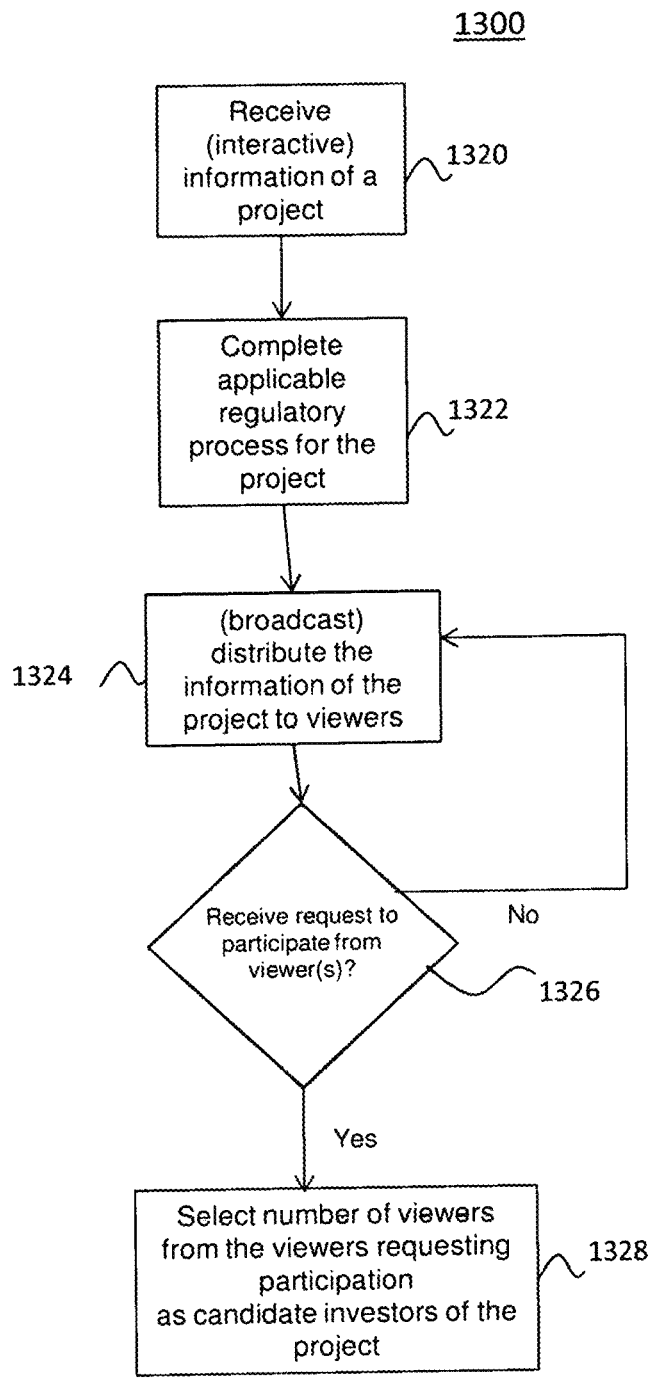
FIG. 14 is an example of a process of facilitating funding a project according to an embodiment.

FIG. 14 illustrates an example of a process 1300 of facilitating funding a project including selecting viewer(s) as candidate investor(s) of a project. As shown in FIG. 14, the process 1300 begins with receiving 1320 (interactive) information of a project. For example, information of a project may be received from an entity, entrepreneur, company, an independent business person for distribution.

After the receiving 1320 (interactive) information of a project, the process 1300 continues to completing 1322 applicable regulatory process for the project. According to an embodiment, the completing 1322 applicable regulatory process includes SEC, FINRA, or any other applicable rule, law or regulation.

Subsequent to completing 1322 applicable regulatory process for the project, the process 40 continues by (broadcast) distributing 1324 the information of the project to viewers. The distribution of the information of the project may be occur through a show transmitted through televisions, websites, connected smart television OTT applications and handheld smart device applications such as a smart phone application.

The (broadcast) distributing 1324 of the information includes but is not limited to indication of compliance with applicable regulations obtained at operation 1322, profile of a company seeking funding for the project, information of investors in current and prior projects, etc.

As illustrated in FIG. 14, the process 1300, after (broadcast) distributing 1324 the information, continues to receiving request 1326 to participate from the viewers. A request to participate in the funding of the project may be received from a viewer viewing the information of the project distributed 1324 by use of a desktop or laptop computer, smart TV, a handheld/portable device, mobile phone, and a specialized terminal, or any machine that is capable of electronically sending and/or receiving of information.

When determining receipt of request 1326 to participate from the viewers, the process moves to selecting a number of viewers 1328 as candidate investors of the project. From among the viewers requesting participation, a number of viewers may be selected 1328 as candidate investors of the project based on various criteria. For example, the number of viewers may be selected 1328 based on corresponding profile information, prior investment history, available funds, etc.

Figure 15:
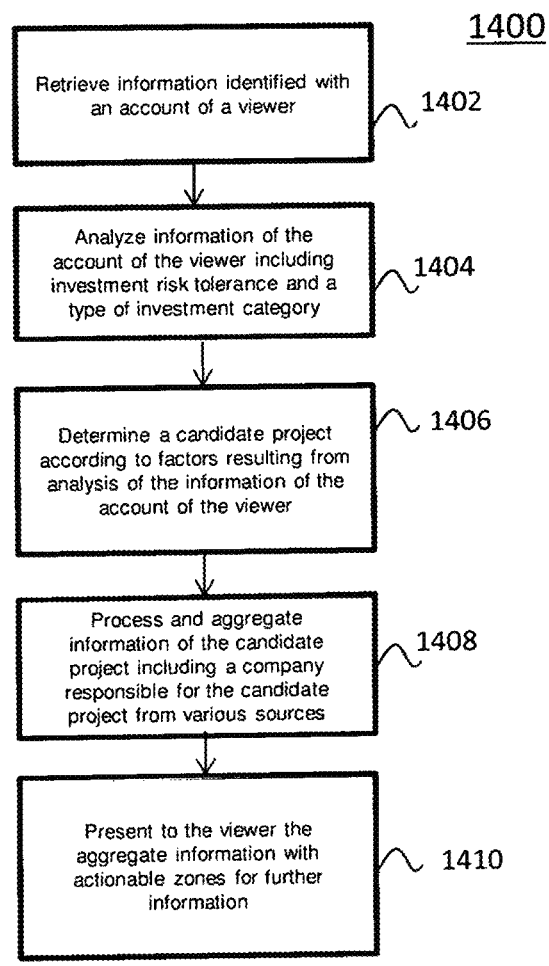
FIG. 15 is an example of a process of an interface useable by a viewer to fund a project according to an embodiment.

FIG. 15 illustrates an example of a process 1400 of an interface useable by a viewer to fund a project according to an embodiment. The process 1400 starts with retrieving information 1402 identified with an account of a viewer. Various information of the viewer may be retrieved 1402 including but not limited to customer identifying information (ID), prior investments, subject matter of interest, location, level of expertise in a field, etc.

Subsequent to retrieving information 1402 identified with the account of a viewer, the process 1400 continues to analyze information 1404 of the account of the viewer including investment risk tolerance and a type of investment category. Analysis of the information 1404 information of the viewer is performed to assess risk tolerance and type of investment category of interest of the viewer.

The process 1400, after analyze information 1404 of the account of the viewer, continues to determine a candidate project 1406 according to factors resulting from analysis of the information of the account of the viewer. The process 1400 then continues to process and aggregate information 1408 of the candidate project including a company responsible for the candidate project from various sources.

After processing and aggregating information 1408 of the candidate project, the process 1400 continues to present 1410 to the viewer the aggregate information with actionable zones for further information.

Figure 16:
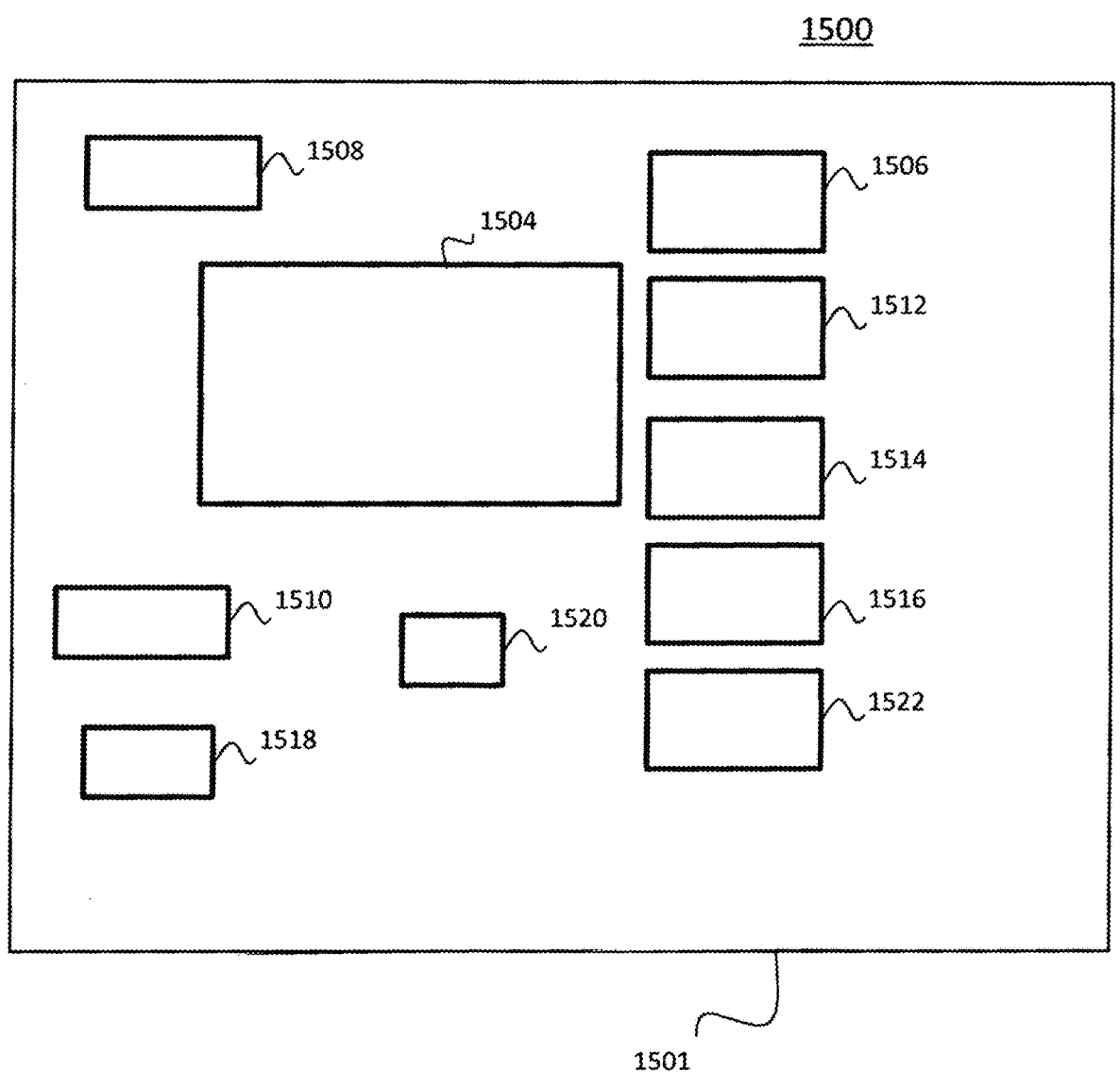
FIG. 16 is an example an interface displaying an on-screen decision matrix according to an embodiment.

FIG. 16 illustrates an example of an interface 1500 displaying an on-screen decision matrix 1501. According to an embodiment, the interface 1500 is a graphical user interface (GUI) displaying an on-screen decision matrix 1501 on a screen of any type of a display apparatus. The on-screen decision matrix 1501 provides several types of information including but not limited to displayable items that are selectable items such as menu items, icons, etc., and/or actionable items displayed in a plurality of regions (zones) of an on-screen decision matrix 1501 which control and/or trigger execution of an operation to be performed.

In an embodiment shown in FIG. 16, a plurality of displayable items 1504, 1506, 1508, 1510, 1512, 1514, 1516, 1518, 1520 and 1522 are displayed in corresponding regions (zones) of the on-screen decision matrix 1501.

The displayable item 1504 shown in FIG. 16 may be a TV, on-demand or live content, live webisode, etc. The displayable item 1504 pertains to content (video/audio) that is distributed to viewer(s). According to an embodiment, the displayable item 1504 is configured to distribute information of an entity seeking funding for a project, information of the project, etc. In an embodiment, the displayable item 1504 of the interface 1500 may be presented as an actionable item such as a menu set of options where the viewer selects a subject matter of the content displayed using an input device of the viewer's computer.

The displayable item 1506 is configured to provide data pertaining to social media or other communication data such as chat functionality, etc. As shown in FIG. 2, the platform's social media integration 210 allows creation and sharing of information, interests, etc., through virtual communities and networks. According to an embodiment, the displayable item 1506 displays different type of social media or other communication posts between an entity needing funding and a viewer.

According to an embodiment, a viewer may be provided with data of accessible funds using the displayable item 1508. For example, a monetary amount that the viewer has in the viewer's account is displayed through the displayable item 1508 located at a predetermined location on a screen. The displayable item 1508 may be dynamically updated to reflect the most current funds available to the viewer, or may be updated periodically.

In an embodiment, the displayable item 1510 displays a result of a process that provides a recommendation as to a project. The displayable item 1510 may indicate approval or disapproval of the project based on various factors including but not limited to profile of the viewer such as investment profile, risk tolerance, available funds, etc., and guides the viewer (investor) to make a decision tailored to their need. In case of content delivery through a TV show, the displayable item 1510 may include not only recommendation based on analysis of a company and/or a project based on various factors including analytics/metrics described in connection FIG. 6 but also indicate approval (thumbs up) or disapproval (thumbs down) of the audience of the show.

The displayable item 1512 provides information of an entity needing funding and/or project information. In an embodiment, any of the information contained in the Companies portal 224 illustrated in FIG. 2 may be made available for presentation via the displayable item 1512. For example, a representative of a company needing funding for a project may select to have the company's profile, the company's previous and pending projects, biographical information of company's decision makers, etc., stored in the Companies portal 224 to be presented to a viewer.

The displayable item 1514 in FIG. 16 may display options for requesting additional funds and trigger a process requesting the additional funds in a situation available funds presented through the displayable item 1508 are insufficient to invest in the project identified via the displayable item 1504 and/or the displayable item 1512. In an embodiment, the displayable item 1514 sends a request to one or more financial institutions requesting a loan which may be submitted with stored information of the viewer and/or any additional information the viewer may choose to submit. Once the process requesting additional funds ends, the displayable item 1514 may be updated to display information of the additional fund including but not limited to monetary amount.

According to an embodiment, the displayable item 1516 may display a current value of the project. The current value presented by the displayable item 1516 may be obtained from experts, the company, etc., or a combination thereof. The viewer may request immediate recalculation of valuation of the project at a current time which is displayed via the displayable item 1516, according to an embodiment.

The displayable item 1518 may present a status/progress of the funding including funds obtained thus far and remainder funding needed. The status/process may indicate a movement towards a funding goal identified by a company and may identify a numerical value that is incremented to reflect the movement.

A viewer may use displayable item 1520 to make an offer to participate in funding of the project or decline participation.

The displayable item 1522 in FIG. 16 provides information of shares/equity offered to a viewer by the company in exchange for participating in the funding of the project.

Accordingly, the disclosed method, apparatus, interface and platform for interactive investing, funding and trading. Using a combination of various delivery and interactive channels mentioned above, a viewer (individual person) may choose to become an active investor in project(s) managed by an entity. The TGDP bundles various elements into one packaged platform to democratize the financial investment market such as content such as an emotion driven reality-TV format video program that show-cases business entities vying for funding moderated and hosted by celebrities and high net-worth individuals. According to an embodiment, software application such as TGDP branded software applications may accompany the platform. The software application may be provided with easy-to-use interactive interfaces for smart devices, smart TVs, web browsers and OTT applications that manage display of various information about the entities seeking funding and manage the global delivery of the content to an assortment of viewing devices. These applications will provide easy to use interactive interfaces where a viewer or potential investor can invest in a fund or direct invest in a listed entity in return for an equivalent equity and/or royalty in the entity.

According to an embodiment, the platform may be an SEC and FINRA compliant exchange trading platform that lists vetted participating companies where investors can buy or sell their ownership positions in the funded companies. The exchange trading platform manages funding transactions including collection and disbursement of funds to entities based on various business rules.

According to an aspect of the embodiments of the invention, any combinations of one or more of the described features, functions, operations, and/or benefits can be provided. The word (prefix or suffix article) "a" refers to one or more. A combination can be any one of or a plurality. The embodiments can be implemented as an apparatus (a machine) that includes processing hardware configured, for example, by way of software executed by the processing hardware and/or by hardware logic circuitry, to perform the described features, functions, operations, and/or benefits. A computing apparatus, such as (in a non-limiting example) any computer or computer processor that includes processing hardware and can store, receive, retrieve, process and/or output data and/or communicate (network) with other computing apparatuses.

According to an aspect of an embodiment, the described features, functions, operations, and/or benefits can be implemented by and/or use processing hardware and/or software executed by processing hardware. For example, any of the computing apparatuses as illustrated in FIG. 1 can comprise a central processing unit (CPU) or computing processing system (e.g., one or more processing devices (e.g., chipset(s), including memory, etc.) that processes or executes instructions, namely software/program, stored in a memory and/or computer readable media, transmission communication interface (network interface), input device, and/or an output device, for example, a display device, a printing device, and which are coupled (directly or indirectly) to each other, for example, can be in communication among each other through one or more data communication buses.

In addition, an apparatus can include one or more apparatuses in computer network communication with each other or other devices and the embodiments relate to augmented exploration for big data involving one or more apparatuses, for example, data or information involving local area network (LAN) and/or Intranet based computing, cloud computing in case of Internet based computing, Internet of Things (IoT) (network of physical objects—computer readable storage media (e.g., databases, knowledge bases), devices (e.g., appliances, cameras, mobile phones), vehicles, buildings, and other items, embedded with electronics, software, sensors that generate, collect, search (query), process, and/or analyze data, with network connectivity to exchange the data), online websites.

In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer-implemented method of providing a financial service using one or more hardware processors, the method comprising:

generating an on-screen decision matrix, using the one or more hardware processors, the on-screen decision matrix including a first window containing content identifying a project for which an entity is requesting funding and indicating a share of the project available for funding, the content identifying the project being stored in a database in association with an identifier of the entity requesting the funding and an identifier of the share of the project available for funding;

displaying a graphical user interface (GUI) including the on-screen decision matrix with the first window containing the content generated on a corresponding display of one or more viewers together with at least one second window containing actionable zones for an input from the one or more viewers, the on-screen decision matrix being displayed such that data aggregators retrieved based on the stored identifier of the entity in association with the project identified are correlated with data obtained through interactive collection of information based on the input from the one or more viewers via the at least one second window;

calculating a current valuation of the project according to an investment predictive model based on information of the data aggregators and the data obtained through the interactive collection from the input from the one or more viewers via the at least one second window containing the actionable zones of the on-screen decision matrix;

identifying a candidate investor, among the one or more viewers to which the content is provided, to participate in the funding of the project;

applying a credit toward the funding of the project upon a confirmation reply from the candidate investor; and performing an electronic transaction involving the project, in response to the applying of the credit, and transferring a value from the entity to the candidate investor in exchange for the credit, wherein the on-screen decision matrix is dynamically updated based on the electronic transaction that is executed using a platform through which the one or more viewers including the candidate investor interactively participate using the on-screen decision matrix in the funding of the project.

2. The computer-implemented method of claim 1, further comprising:

calculating a probability of whether the project reaches a value, and displaying information of the probability to the candidate investor.

3. The computer-implemented method of claim 1, wherein the candidate investor is identified based on a risk tolerance value associated with a profile of the candidate investor.

4. The computer-implemented method of claim 1, wherein the content provided is a broadcast containing a streaming video about the project and the entity requesting the funding.

5. The computer-implemented method of claim 1, wherein the on-screen decision matrix associated with a first viewer among the one or more viewers through which the content is provided contains a selected actionable zone among the actionable zones undisplayed to a second viewer among the one of more viewers.

6. The computer-implemented method of claim 1, wherein the on-screen decision matrix is customizable for selected viewers based on a location of the selected viewers among the one or more viewers.

7. An apparatus for providing a financial service, the apparatus comprising:

a display;

a database to store information of ongoing projects, profiles of users and profiles of companies;

a hardware processor configured to:

generate an on-screen decision matrix including a first window containing content identifying a project among the ongoing projects for which an entity is requesting funding and indicating a share of the project available for funding, the content identifying the project being stored in the database in association with an identifier of the entity requesting the funding and an identifier of the share of the project available for funding, display a graphical user interface (GUI) including the on-screen decision matrix with the first window containing the content generated on a corresponding display of the users together with at least one second window containing actionable zones for an input from the users, the on-screen decision matrix being displayed such that data aggregators retrieved based on the stored identifier of the entity in association with the project identified are correlated with data obtained through interactive collection of information based on the input from the users via the at least one second window, calculating a current valuation of the project according to an investment predictive model based on information of the data aggregators and the data obtained through the interactive collection from the input from the users via the at least one second window containing the actionable zones of the on-screen decision matrix, identify a candidate investor, among the users to which the content is provided, to participate in the funding of the project, apply a credit toward the funding of the project though an electronic process upon a confirmation reply from the candidate investor, and perform an electronic transaction involving the project, in response to the credit being applied, and transfer a value from the entity to the candidate investor in exchange for the credit, wherein the on-screen decision matrix is dynamically updated based on the electronic transaction that is executed using a platform through which the users including the candidate investor interactively participate using the on-screen decision matrix in the funding of the project.

* * * * *